(12) United States Patent
Takamine et al.

(10) Patent No.: US 6,771,914 B2
(45) Date of Patent: Aug. 3, 2004

(54) IMAGE FORMATION CONTROL METHOD, IMAGE FORMING APPARATUS USING THE SAME AND STORAGE MEDIUM TO WHICH THE SAME IS APPLIED

(75) Inventors: Kouichi Takamine, Kawanishi (JP); Kazuyuki Murata, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 176 days.

(21) Appl. No.: 10/088,066

(22) PCT Filed: Jul. 4, 2001

(86) PCT No.: PCT/JP01/05823

§ 371 (c)(1),
(2), (4) Date: Mar. 7, 2002

(87) PCT Pub. No.: WO02/06052

PCT Pub. Date: Jan. 24, 2002

(65) Prior Publication Data

US 2002/0136564 A1 Sep. 26, 2002

(30) Foreign Application Priority Data

Jul. 14, 2000 (JP) ........................................ 2000-214829

(51) Int. Cl.$^7$ .............................................. G03G 15/00
(52) U.S. Cl. ........................................ 399/82; 399/85
(58) Field of Search ............................... 399/8, 80, 82, 399/83, 85, 86, 366

(56) References Cited

U.S. PATENT DOCUMENTS

| | | | | |
|---|---|---|---|---|
| 5,016,171 A | * | 5/1991 | Connolly et al. | 399/79 |
| 5,053,813 A | * | 10/1991 | Moro | 399/80 |
| 5,096,180 A | | 3/1992 | Nagaoka et al. | 271/110 |
| 5,115,273 A | * | 5/1992 | Ujiie et al. | 399/83 |
| 5,530,520 A | * | 6/1996 | Clearwater | 399/366 |
| 6,065,830 A | | 5/2000 | Hiramatsu et al. | 347/104 |
| 6,112,035 A | * | 8/2000 | Kuroyanagi et al. | 399/8 |
| 6,285,843 B1 | * | 9/2001 | Obata | 399/82 |

FOREIGN PATENT DOCUMENTS

| | | | |
|---|---|---|---|
| JP | 5-22584 A | 1/1993 |
| JP | 5-77533 | 3/1993 |
| JP | 6-8537 A | 1/1994 |
| JP | 9-50171 A | 2/1997 |
| JP | 9-81344 A | 3/1997 |
| JP | 9-286152 A | 11/1997 |
| JP | 11-3190 A | 1/1999 |
| JP | 11-34438 A | 2/1999 |
| JP | 2000-13718 A | 1/2000 |
| JP | 2000-62254 A | 2/2000 |
| JP | 2000-194520 A | 7/2000 |
| JP | 2000-214732 A | 8/2000 |
| JP | 2001-184184 A | 7/2001 |
| JP | 2001-218030 A | 8/2001 |

* cited by examiner

Primary Examiner—Fred Braun
(74) Attorney, Agent, or Firm—Merchant & Gould P.C.

(57) ABSTRACT

An image formation and control method and apparatus enabling a user to print data to be printed reliably up to the limited reproduction number permitted to the user even if troubles at the time of printing occur when the number of reproductions of the data to be printed is limited, is presented. With reference to the printing management information added to the data to be printed, when the number of reproductions of the data to be printed is limited, the mode is changed from the performance priority mode for normally reproducing data to be printed into the safety priority mode capable of carrying out the required reproduction more reliably than in the performance priority mode, the number of printing of the data to be printed is managed as a printing history, and the printing of the data to be printed is controlled based on the number of reproductions of the data to be printed and the managed printing history.

35 Claims, 16 Drawing Sheets

IMAGE FORMATION CONTROL METHOD, IMAGE FORMING APPARATUS USING THE SAME AND STORAGE MEDIUM TO WHICH THE SAME IS APPLIED

TECHNICAL FIELD

The present invention relates to a technique used for a digital copying machine, a printer, a facsimile, or the like, and for outputting image data and text data offline automatically and efficiently by recording image data and text data together with predetermined information relating to the management and processing thereof onto a removable and portable storage medium.

BACKGROUND ART

In recent years, demand for high speed and multifunction of a digital copying machine has increased. A so-called digital composite machine has appeared, which is provided with a facsimile function, a printer function, and the like, in addition to a copying function. Hereinafter, a conventional digital copying machine will be explained with reference to drawings.

FIG. 17 is a block diagram showing a flow of an image signal in a conventional digital copying machine.

As shown in FIG. 17, an image sensor 71 scans a document to convert reflected light from the document into an electrical signal. An analog image signal from the image sensor 71 is converted into a digital image signal by an A/D converter 72. The converted digital image signal is subjected to image processing such as an edge enhancement, trimming, half-tone processing, or the like, and edit processing in an image processing circuit 73. The image signal output from the image processing circuit 73 is buffered in a buffer memory 74 for speed control, and subsequently output to a laser driver 78. This laser driver 78 drives a semiconductor laser 79 to form an electrostatic latent image by laser beams output from the semiconductor laser 79.

The digital copying machine further includes a CPU 85, a LAN controller 80, a page memory 84, a parallel I/F 81, a CCU (communication control unit) 82 and a compression/expansion circuit 86, which are mutually connected by a CPU bus 83.

The CPU 85 has a RAM and a ROM and controls the entire digital copying machine. The page memory 84 has capacity that can store at least one page of image data and is connected to the buffer memory 74. Image data stored in the page memory 84 are output to the laser driver 78 through the buffer memory 74 to be recorded on a recording paper.

The LAN controller 80 communicates with an external equipment through a local area network (LAN). When the digital copying machine is used as a remote printer, an external equipment such as a computer transmits a print control command or image data to the digital copying machine through the LAN. The CPU 85 decompresses the image data received through the LAN in the page memory based on the received print control command.

Using the parallel I/F 81, the digital copying machine and an external equipment can be connected one to one. When the digital copying machine is used as a printer for the external equipment, the external equipment transmits a print control command or image data to the digital copying machine through the parallel I/F 81 of the digital copying machine. When the external equipment uses the image scanner function of the digital copying machine, the external equipment transmits a document read-out control command to the digital copying machine through the parallel I/F 81, and the read-out document image data is transmitted from the digital copying machine to the external equipment.

The CCU 82 communicates with an external facsimile through a public line by using a modem 87. Image data received by facsimile is expanded in the compression/expansion circuit 86, transferred to the page memory 84, and printed out. Also, document image data read out for facsimile transmission are stored in the page memory 84, compressed in the compression/expansion circuit 86, and transmitted to the external facsimile through the CCU 82 and the modem 87.

Next, a conventional image reader will be explained.

FIG. 18 is a block diagram showing a flow of an image signal in a conventional image reader.

In FIG. 18, an image sensor 171 scans a document to convert reflected light from the document into an electrical signal. An analog image signal output from the image sensor 171 is converted into a digital image signal by an A/D converter 172, and subsequently input to an image processing circuit 173. The image processing circuit 173 performs image processing such as edge enhancement, trimming, halftone processing, pixel density conversion, and gradation level conversion as well as edit processing on the digital image signal. The image data output from the image processing circuit 173 are buffered in a buffer memory 174.

For controlling the entire image reader, a CPU 185 having a RAM and a ROM is provided. The CPU 185, the image processing circuit 173, the buffer memory 174, a DMA controller 180 and a SCSI controller 181 are mutually connected through a CPU bus 183.

The DMA controller 180 transfers the image data stored in the buffer memory 174 to the SCSI controller 180. An external equipment such as a computer etc. transmits a control command of the image reader to the image reader through the SCSI controller 180 and receives image data from the image reader. The CPU 185 sets the degree of edge enhancement, the gradation level of image data, and read density, etc. in accordance with the image read-out control command.

In general, a high-speed digital PPC capable of copying several tens sheets or more per minute is located in a common space such as a copy room or a hallway. When copying a text prepared by a personal computer, etc. in plural copies, a user has to print a document with a nearby printer, take the printed document to a place where a digital copying machine is located, and then copy the document in plural copies using a sorter, etc. of the digital copying machine. In particular, when a personal computer used by a user is not connected through a LAN, the remote print function of the digital copying machine cannot be used, so that copying must be done as mentioned above. In this case, a document image is once printed out on paper before copying it, and therefore degradation of the image is inevitable.

When a personal computer used by a user is connected to the digital copying machine through a LAN, the user can use the remote print function of the digital copying machine. Therefore, the user can directly utilize a function such as a sorter of the digital copying machine from his/her personal computer. However, when copying by using the remote print function of the digital copying machine, the user has to go to a distant place where the digital copying machine is located to obtain the printed paper. Furthermore, when copying in a large amount using the remote print function, problems such as running out of paper for copying and paper jam are likely to occur. To solve such troubles, the user also has to go to the place where the digital copying machine is located. Thus, it may be considered that the utility value of the remote (online) print function in a high-speed digital copying machine is not so high.

When using the image scanner function of the digital copying machine from a user's personal computer online by using the parallel I/F 81 or the LAN shown in FIG. 17, similar problems arise. That is, the user has to go to a distant place where the digital copying machine is located to set a document in the image scanner portion of the digital copying machine. Therefore, when the digital copying machine and the user's computer are located at places apart from each other, it is not useful to use the image scanner function of the digital copying machine online.

Furthermore, the above-mentioned image reader is connected to an external equipment such as a personal computer one to one using an interface such as a SCSI. Therefore, the image reader is used exclusively by the user of the connected personal computer. When another user uses the image reader, the user has to use the personal computer connected to the image reader or reconnect the image reader to his/her personal computer.

Furthermore, in a case where a user carries a personal computer to a business destination and prints the document there, the user has to connect his/her personal computer to a LAN at the business destination, which is inconvenient. In some cases, from the viewpoint of the security, connecting the portable PC to the LAN at the business destination may be prohibited. If a printer or a scanner or in a convenience store has an offline function, it is possible to printed out printed data easily through a memory card, or to convert paper data into electronic form data.

In order to solve the above-mentioned problems, the present applicant proposed an image output apparatus, etc. on which a portable storage medium (memory card) that easily can be used for a digital copying machine, an image reader (scanner), an image formation apparatus (printer), a facsimile, a mobile telephone, a TV receiver, etc. and that can output image data and text data offline automatically and efficiently by recording image data and text data together with predetermined information relating to the management and processing thereof onto a removable and portable storage medium; a recording device (memory card writer); and a memory reader are mounted.

According to an image output apparatus on which the proposed memory card, memory card writer, and memory reader are mounted, it is further possible to provide the offline print function by attaching a memory card into a mobile telephone on which memory card writer is mounted, storing electronic mail or text file received on the mobile telephone in the memory card, and then inserting this memory card into an equipment with print function such as the facsimile, printer, etc. on which the memory card reader is mounted.

Furthermore, also in the TV receiver capable of receiving data broadcasting, it is further possible to provide the offline print function by attaching a memory card into a mobile telephone on which a memory card writer is mounted, storing electronic mails or text file received on the mobile telephone in the memory card and then inserting this memory card into an equipment with print function such as the facsimile, printer, etc. on which the memory card reader is mounted.

Furthermore, after a slide image data produced by the computer on which a memory card writer is mounted is stored in the memory card, this memory card is inserted into an equipment with display function such as a liquid crystal projector etc. on which a memory card reader is mounted, thus making it possible to realize the presentation without using a computer.

However, when the contents of the file are printed by a printer on which the above-mentioned memory card reader is mounted, in some cases, the number of reproduction is limited from the viewpoint of the protection of the copyright of data to be printed. In such a case, within the permitted number of reproductions, even if troubles at the time of printing such as a paper jam, deficiency of toner, ink and paper etc. occur, the printing in the permitted number of reproductions has to be provided to a user reliably.

Furthermore, if the user carries out the printing more than the permitted number of reproductions or does the like, printing has to be limited from the viewpoint of the protection of copyright of data to be printed.

DISCLOSURE OF THE INVENTION

With the foregoing in mind, it is an object of the present invention to provide an image formation and control method, wherein the number of reproductions is limited, troubles at the time of printing are prevented beforehand, data to be printed can be reliably printed up to the permitted number of reproductions to a user and also it becomes possible to correspond to the case in which printing is carried out beyond the limited number of reproductions, an image formation and control apparatus using the method, and a storage medium to which the method is applied.

In order to achieve the above-mentioned object, a first image formation and control method of the present invention includes a performance priority mode for normally reproducing data to be printed, and a safety priority mode capable of carrying out the required reproduction more reliably than in the performance priority mode, wherein the performance priority mode or the safety priority mode is selectable.

According to the first method, by selecting the performance priority mode at the time of normal printing and changing the performance priority mode into the safety priority mode in which troubles at the time of printing can be detected reliably to prevent them from occurring, when the copyright protection is required, printing can be carried out reliably.

In order to achieve the above-mentioned object, a second image formation and control method of the present invention includes a performance priority mode for normally reproducing data to be printed and a safety priority mode capable of carrying out the required reproduction more reliably than in the performance priority mode, wherein when the number of reproductions of the data to be printed is limited, the performance priority mode is changed into the safety priority mode.

According to the second method, by changing the performance priority mode into the safety priority mode in which troubles at the time of printing can be detected reliably to prevent troubles beforehand when the number of reproductions of data to be printed is limited due to the protection of copyright etc., printing can be carried out reliably.

In order to achieve the above-mentioned object, a third image formation and control method of the present invention includes a performance priority mode for normally reproducing data to be printed and a safety priority mode capable of carrying out the required reproduction more reliably than in the performance priority mode, wherein either the performance priority mode or the safety priority mode is selected based on printing management information added corresponding to the data to be printed.

According to the third method, when the printing management information added to the data to be printed requires reliable reproduction, the safety priority printing mode is selected automatically, thereby printing the data to be printed reliably.

In order to achieve the above-mentioned object, a fourth image formation and control method of the present invention includes a performance priority mode for normally reproducing data to be printed, and a safety priority mode capable of carrying out the required reproduction more reliably than in the performance priority mode, wherein when the number of reproducing the data to be printed is limited, the performance priority mode is changed into the safety priority mode based on the printing management information added corresponding to the data to be printed.

According to the fourth method, when the number of reproductions of data to be printed is limited and the printing management information added corresponding to the data to be printed requires reliable reproduction, by changing the performance priority mode into the safety priority mode, it is possible to carry out the printing of the data to be printed reliably.

In order to achieve the above-mentioned object, a fifth image formation and control method of the present invention includes a performance priority mode for normally reproducing data to be printed, and a safety priority mode capable of carrying out the required reproduction more reliably than in the performance priority mode. The method includes changing the performance priority mode into the safety priority mode when the number of reproductions of the data to be printed is limited; managing the number of printings of the data to be printed as a printing history; and controlling the printing of the data to be printed based on the number of reproductions of the data to be printed and the managed printing history.

According to the fifth method, when the number of reproductions of the data to be printed is limited, by controlling the printing of the data to be printed based on the limited number of reproduction and the printing history, it is possible to carry out the printing in a number of times in conformity with the reproduction number of a printing file.

In the fifth method, it is preferable that the method includes: detecting the ejection of recording media on which the data printing is carried out; receiving a printing end information for reducing the number of reproductions of the data to be printed one by one in response to the detection of the ejection of the recording media; and updating the printing history based on the printing end information.

Thus, it is possible to manage the number of reproductions in the printing history by reducing the number of reproductions of the data to be printed one by one in response to the detection of the ejection of the recording medium on which data printing is carried out. Thus, it is possible to carry out the printing in a number of times in conformity with the reproduction number of the printing file.

In the first image formation and control method, it is preferable that when the mode is changed into the safety priority mode capable of carrying out the reproduction more reliably than in the performance priority mode, a second condition is set in which a feed control accuracy of the recording media is higher than in a first condition in which the performance priority mode is set.

Thus, by making the feed control accuracy of the recording medium in the safety priority mode higher than that in the performance priority mode, it is possible to detect paper jam, feeding of several thicknesses of recording paper or the like reliably, and to realize the reliable printing of the data to be printed.

Furthermore, in this case, it is preferable that printing management information indicating whether the number of reproductions is limited is added to the data to be printed and when it is determined that the number of reproductions is limited with reference to the information, the condition is changed into the second condition for setting the safety priority mode in which the feed control accuracy of the recording medium is higher than in the first condition in which the performance priority mode is set.

Thus, when the number of reproductions of the data to be printed has is limited, by changing the condition into the second condition for setting the safety priority mode in which the feed control accuracy of recording media is higher than that in the first condition for setting the performance priority mode for normally reproducing data to be printed, it is more reliably detected that the printing could not be carried out normally, and in the case of detection of error, not counting the printing against the number of reproductions to be done. Therefore, it is possible to avoid a problem in which reproductions cannot be carried out within the limited number of reproductions and to provide a user with printing a number of times in conformity with the number of reproductions of the data to be printed.

It is preferable that the first and the second conditions respectively include first and second time intervals for detecting the feed state of the recording media, and the second time interval is shorter than the first time interval. Thus, it is possible to improve the accuracy for detecting errors in feeding the recording media and to provide a user with a number of printing times in conformity with the number of reproductions of the data to be printed.

Furthermore, it is preferable that the first and the second conditions respectively include first and second feed intervals between the recording media, and the second feed interval is longer than the first feed interval. Thus, it is possible to reduce the possibility of a problem in which although the feed error of recording media occurs, a subsequent recording medium is carried, causing false detection of the feed error; and to provide a user with a number of printing times in conformity with the number of reproductions of the data to be printed with reproduction quality of the data to be printed secured.

Furthermore, it is preferable that the first and the second conditions respectively include a first time margin and a second time margin in detecting feed errors of the recording media, and the second time margin is shorter than the first time margin. Thus, it is possible to detect feeding of several thicknesses or inclination of recording media, etc. more reliably and to provide a user with a number of printing times in conformity with the number of reproductions of the data to be printed with the quality of the data to be printed secured.

In the first image formation and control method, it is preferable that when the mode is changed into the safety priority mode capable of carrying out the reproduction more reliably than in the performance priority mode, the limit value of the remaining amount of a marking agent used for data printing onto recording media is changed from a first set value to a second set value that is larger than the first set value and when it is determined that the detected remaining amount is not more than the second set value, as a result of detecting the remaining amount of the marking agent, the execution of the data printing is controlled to be disabled.

Thus, in the safety priority mode, the limit value of the remaining amount of the marking agent is managed more strictly based on the second set value that is larger than the first set value in the performance priority mode and when the remaining amount of the marking agent is not more than the second set value, data printing is not carried out. Consequently, it is possible to provide a user with printing with the image quality secured.

Furthermore, in the third image formation and control method, it is preferable that the printing management information includes information indicating whether the number of reproductions of the data to be printed is limited and when it is determined that the number of reproductions is limited with reference to the information, the limit value of a remaining amount of a marking agent used for data printing onto recording media is changed from a first set value to a second set value that is larger than the first set value, and when it is determined that the detected remaining amount is not more than the second set value, as a result of detecting the remaining amount of the marking agent, the execution of the data printing is controlled to be disabled.

Thus, in the case where the number of reproductions of the data to be printed is limited, the limit value of the remaining amount of the marking agent is managed more strictly based on the second set value that is larger than the first set value in the performance priority mode and when the remaining amount of the marking agent is not more than the second set value, data printing is not carried out. Consequently, it is possible to provide a user with a number of printing times in conformity with the number of reproductions of the data to be printed with the quality of the data to be printed secured.

In order to achieve the above-mentioned object, a sixth image formation and control method of the present invention includes controlling the execution of the data printing to be disabled, when it is determined that the detected remaining amount of the recording media is not more than a predetermined limit value, as a result of detecting the remaining amount of recording media for data printing.

According to the sixth method, it is possible to prevent the printing reliably from being carried out on different-sized recording media instead of the designated-sized recording media that are lacking. Thus, it is possible to provide a user with printing onto the originally designated-sized recording medium.

Furthermore, it is preferable that when the number of reproductions of the data to be printed is limited, the execution of the data printing is controlled to be disabled based on the detected remaining amount of the recording media on which the data printing is carried out. Thus, it is possible to provide a user with printing onto the originally designated-sized recording medium a number of times in conformity with the number of reproductions.

Furthermore, in the first image formation and control method, it is preferable that when the mode is changed into the safety priority mode capable of carrying out the reproduction more reliably than in the performance priority mode, the limit value of a remaining amount of recording media on which data are printed is changed from a first set value to a second set value that is larger than the first set value and when it is determined that the detected remaining amount is not more than the second set value, as a result of detecting the remaining amount of the recording media, the execution of data printing is controlled to be disabled.

Thus, in the safety priority mode, the limit value of the remaining amount of recording media is managed more strictly based on the second set value that is more larger than the first set value in the performance priority mode and when the remaining amount of recording media is not more than the second set value, data printing is not carried out. Thereby, it is possible to prevent the printing reliably from being carried out on different-sized recording media instead of the designated-sized recording media that are lacking. Consequently, it is possible to provide a user with printing onto the originally designated-sized recording medium.

Furthermore, in the third image formation and control method, it is preferable that the printing management information includes information indicating whether the number of reproductions of the data to be printed is limited and when it is determined that the number of reproductions is limited with reference to the information, the limit value of a remaining amount of recording media on which data are printed is changed from a first set value to a second set value that is larger than the first set value and when it is determined that the detected remaining amount is not more than the second set value, as a result of detecting the remaining amount of the recording media, the execution of the data printing is controlled to be disabled.

Thus, when the number of reproductions of the data to be printed is limited, the limit value of the remaining amount of the recording media is managed more strictly based on the second set value that is more larger than the first set value, and when the remaining amount of the recording media is not more than the second set value, data printing is not carried out. Thereby, it is possible to prevent the printing reliably from being carried out on different-sized recording media instead of the designated-sized recording media that are lacking. Consequently, it is possible to provide a user with printing onto the originally designated-sized recording medium.

Furthermore, in the first image formation and control method, it is preferable that when the mode is changed into the safety priority mode capable of carrying out the reproduction more reliably than in the performance priority mode and the data-processing is required for printing, the method allows a user to check whether the data printing is carried out.

Thus, in the safety priority mode, before the data printing is carried out, by allowing a user to check whether the data printing is carried out with data processed, it is possible to prevent printed data with inferior quality due to the data processing from being provided to a user wrongly. Consequently, the user can select either printing onto a recording medium with original quality by a different printer etc. in which data processing is not required, or printing by the printer concerned even if the quality is deteriorated.

In order to achieve the above-mentioned object, a seventh image formation and control method of the present invention includes allowing a user to check whether the data printing is carried out, when the number of reproductions of the data to be printed is limited and the data-processing is required for printing.

According to the seventh method, when the number of reproductions of data to be printed is limited, by allowing a user to check whether the data printing is carried out with data processed before the data printing is carried out, it is possible to prevent printed data with inferior quality due to the data processing from being provided to the user wrongly. Thus, the user can select either printing on a recording medium having an originally-designated quality by a different printer etc. in which data processing is not required a number of times in conformity with the reproduction number of the different printer; or printing by the printer a number of times in conformity with the reproduction number even if the quality is deteriorated.

In the third image formation and control method, it is preferable that the printing management information includes information indicating whether the number of reproductions of the data to be printed is limited and when it is determined that the number of reproductions is limited with reference to the information and the data-processing is required for printing, the method allows a user to check whether the data printing is carried out.

Thus, when the number of reproducing data to be printed is limited, by allowing a user to check whether the data printing is carried out with data processed before the data printing is carried out, it is possible to prevent printed data with inferior quality due to the data processing from being provided to the user wrongly. Thus, the user can select either printing on a recording medium having an originally-designated quality by a different printer etc, in which data process is not required a number of times in conformity with the reproduction number of the different printer; or printing by the printer a number of times in conformity with the reproduction number even if the quality is deteriorated.

Furthermore, in the first image formation and control method, it is preferable that when the mode is changed into the safety priority mode capable of carrying out the reproduction more reliably than in the performance priority mode and the data-processing is required for printing, the execution of the data printing is controlled to be disabled.

Thus, in the safety priority mode, when it is determined that the printing is required to be carried out with data processed, by disabling the execution of the data printing, it is possible to prevent the printed data with inferior quality due to the data processing from being provided to a user wrongly.

In order to achieve the above-mentioned object, the eighth image formation and control method of the present invention includes controlling the execution of the data printing to be disabled, when the number of reproductions of the data to be printed is limited and the data-processing is required for printing.

According to the eighth method, the number of reproductions of data to be printed is limited, when it is determined that printing is required to be carried out with data processed, by disabling the execution of the data printing, it is possible to prevent the printed data with inferior quality due to the data processing from being provided to a user wrongly. Thus, it is possible to provide the user with printing onto a recording medium with originally-designated quality by a different printer etc. in which data processing is not required a number of times in conformity with the reproduction number.

Furthermore, in the third image formation and control method, it is preferable that the printing management information includes information indicating whether the number of reproductions of the data to be printed is limited and when it is determined that the number of reproductions is limited with reference to the information and the data-processing is required for printing, the execution of data printing is controlled to be disabled.

Thus, when it is determined that the number of reproductions of the data to be printed is limited and the printing is required to be carried out with data processed, by disabling the execution of the data printing, it is possible to prevent the printed data with inferior quality due to the data processing from being provided to a user wrongly. Thus, it is possible to provide the user with printing onto a recording medium with originally-designated quality by a different printer etc. in which data processing is not required a number of times in conformity with the reproduction number.

Moreover, a criterion by which to determine whether the data-processing is required for printing is whether the data printing requires the resolution conversion. Thus, when the printing resolution of the printing apparatus is lower than that of the original data, it is possible to prevent the image from being printed with image enlarged on a recording medium that is different from the original one.

Furthermore, a criterion by which to determine whether the data-processing is required for printing is whether the data printing requires the color/black-and-white conversion. Thus, it is possible to prevent data that originally are color data from being printed in black-and-white, which is contrary to a user's will, when a printing apparatus corresponds to black-and-white printing.

In order to achieve the above-mentioned object, a ninth image formation and control method of the present invention includes carrying out the data printing with the image quality deteriorated, when the number of reproducing data to be printed is limited and the remaining number of reproductions becomes zero by repeating the reproduction of the data.

According to the ninth method, by printing data with the image deteriorated, it is possible to realize an easy copyright protection.

In the fifth image formation and control method, it is preferable that when the remaining number of reproductions in the printing history becomes zero, the condition is changed into a third condition for setting a third mode in which data printing is carried out with the image quality deteriorated. Moreover, the third condition includes a setting for processing so as to deteriorate the image of the data to be printed, or a setting for processing so as to deteriorate the image of the read-out data without deteriorating the data to be printed.

Thus, by printing data with the image deteriorated, it is possible to realize an easy copyright protection.

Alternatively, in the fifth image formation and control method, it is preferable that when the remaining number of reproductions in the printing history becomes zero, the execution of the data printing is disabled.

Thus, it is possible to realize a perfect copyright protection.

In order to achieve the above-mentioned object, a tenth image formation and control method of the present invention includes disabling the execution of the data printing, when the number of reproductions of the data to be printed is limited and the remaining number of reproductions becomes zero by repeating the reproduction of the data.

According to the tenth method, it is possible to realize a perfect copyright protection.

In order to achieve the above-mentioned object, an image formation apparatus of the present invention uses the first image formation and control method.

According to this apparatus, by managing the number of reproductions of data to be printed, the protection of copyright is realized easily, and when the number of reproductions of the data to be printed is limited, it is possible to realize appropriate printing by avoiding troubles at the time of printing.

In order to achieve the above-mentioned object, a first storage medium of the present invention is provided to which a first image formation and control method is applied and in which the data to be printed are stored.

In order to achieve the above-mentioned object, a second storage medium of the present invention is provided to which the third image formation and control method is applied and in which the data to be printed and the printing management information are stored.

Moreover, it is preferable that the first and the second storage media is a portable memory storage medium.

BEST MODE FOR CARRYING OUT THE INVENTION

Hereinafter, preferable embodiments of the present invention will be explained specifically with reference to drawings.

Figure 1:
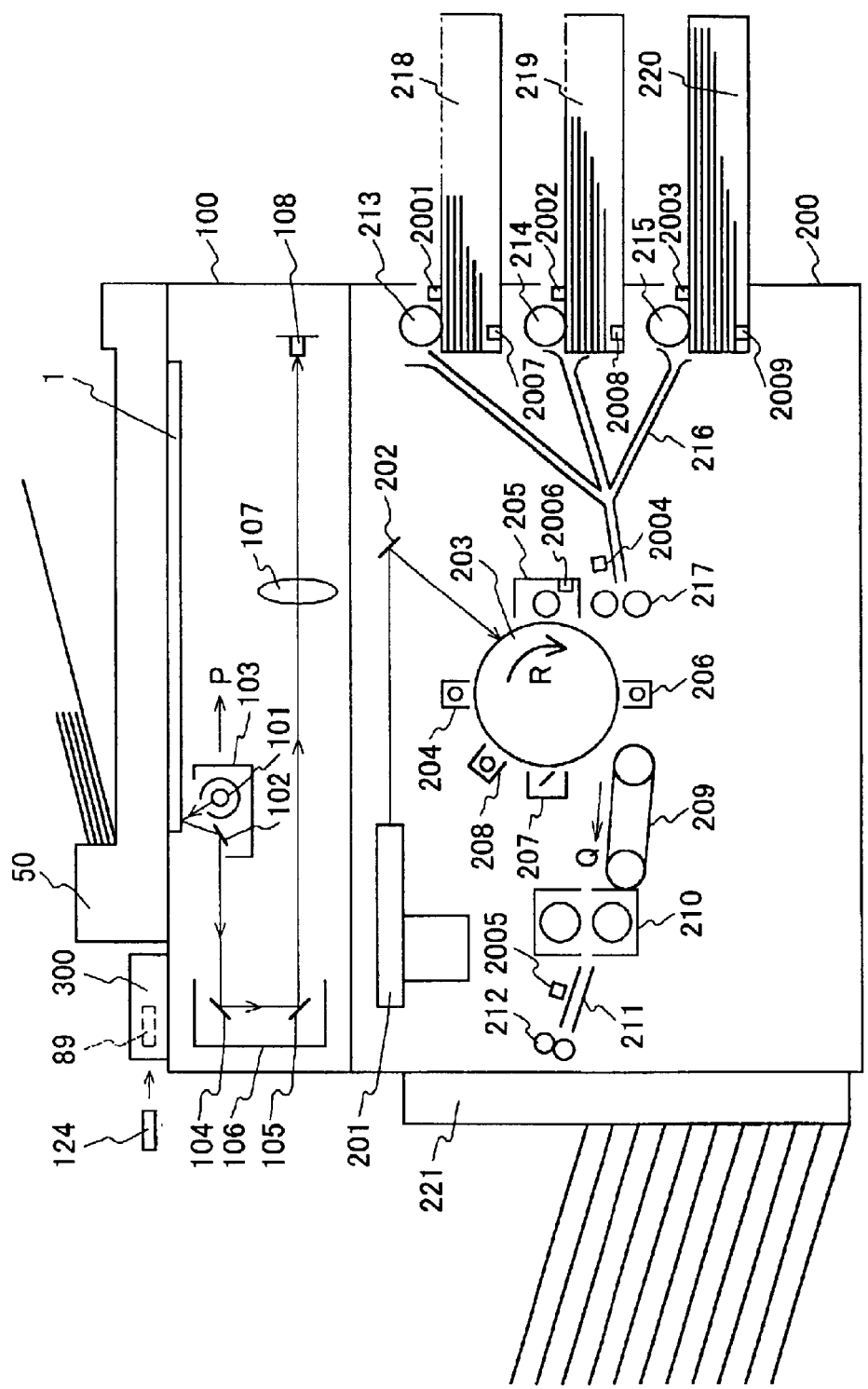
FIG. 1 is a cross-sectional view showing a configuration of a digital copying machine according to one embodiment of the present invention.

FIG. 1 is a cross-sectional view schematically showing an internal structure of a digital copying machine as an image formation apparatus according to one embodiment of the present invention.

In FIG. 1, the digital copying machine includes an ADF (auto document feeder) 50 provided on a document glass plate 1, an image scanner portion 100 provided beneath the document glass plate 1, a laser printer portion 200 provided independently beneath the image scanner portion 100, and an operation portion 300 provided at the side of the document glass plate 1. The operation portion 300 is provided with a memory card slot 89 into which a memory card 124 as a portable storage medium is inserted.

Furthermore, the operation portion 300 is provided with a control panel 301. The control panel 301 includes a liquid crystal display 302 with a touch panel, a start button 303 for copying etc., a stop button 304, a pause button 305 and input buttons 306 such as a numeric keypad (see FIG. 2).

The image scanner portion 100 includes an exposure lamp 101, a first mirror 102, a constant-speed unit 103, a second mirror 104, a third mirror 105, a half-speed unit 106, a lens 107 and an image sensor 108.

The laser printer portion 200 includes a laser scanner unit 201, a mirror 202, a photosensitive drum 203, a main charger 204, a developing device 205, a transfer charger 206, a cleaner 207, a discharge lamp 208, a carrying belt 209, a fixing device 210, a guide 211, a sheet ejection roller 212, sheet feed rollers 213, 214 and 215, a guide 216, a timing roller 217, recording sheet cassettes 218, 219 and 220 and a sorter 221. The laser scanner unit 201 includes a semiconductor laser, a polygon motor, a polygon mirror and a laser optical system.

In the developing device 205, a toner remaining sensor 2006 for detecting a remaining amount of toner is provided. With respect to the recording sheet cassettes 218 and 219 and 220, paper feed sensors 2001, 2002 and 2003 and paper remaining sensors 2007, 2008 and 2009 for detecting the remaining amount of recording sheets are provided, respectively. Furthermore, in the middle of a recording sheet feed path from the guide 216, a pass sensor 2004 is provided. Between the fixing device 210 and the sheet ejection roller 212, a sheet ejection sensor 2005 is provided.

The following is an explanation of a basic operation of the digital copying machine having the above-mentioned configuration.

A plurality of documents disposed on the ADF 50 are set face downward one by one by the ADF on the transparent document glass plate 1. When the exposure lamp 101 exposes a document, light reflected from the document is reflected by the first mirror 102 toward the second mirror 104. The constant-speed unit 103 including the exposure lamp 101 and the first mirror 102 moves in the direction of the arrow P at a constant-speed and scans the document. The half-speed unit 106 including the second mirror 104 and the third mirror 105 further reflects the reflected light from the first mirror 102 and moves in the same direction as that of the constant-speed unit 103 at half the speed of the constant-speed unit 103. The reflected light from the document passes through the half-speed unit 106, is converged by a lens 107 and is focused on the image sensor 108.

The photosensitive drum 203 rotates in the direction of the arrow R at a constant-speed. The main charger 204 charges the photosensitive drum 203 uniformly. Laser beams output from the laser scanner unit 201 are reflected by the mirror 202 to form an electrostatic latent image on the photosensitive drum 203. The developing device 205 develops the electrostatic latent image using toner to form a toner image on the photosensitive drum 203.

At this normal image formation time (performance priority mode), based on a signal from the toner remaining sensor 2006 provided in the developing device 205, when the limit value of the remaining amount of toner becomes not more than the first set value, an alarm "toner is used out" is given to a user by the liquid crystal display 302 on the operation portion 300 or by other means, and copying onto the recording sheet can be carried out. But the quality is likely to be deteriorated.

On the other hand, at the time of the image formation of the data protected by copyright (safety priority mode), that is, when the image formation is carried out not by reading out a document but with respect to data stored in the memory card 124 that is inserted into the memory card slot 89, and when the data are protected by copyright in which the number of reproductions is limited, reliable image formation is required within the number of reproductions. In this case, based on a signal from the toner remaining sensor 2006, when the limit value of the toner remaining amount becomes not more than the second set value that is larger than the first set value, the execution of the image formation is disabled.

The cassettes 218, 219 and 220 are removable, and a plurality of types of sheets having different combinations of sheet sizes and directions are held in respective cassettes. The sheet feed rollers 213, 214 and 215 feed paper in the cassette one by one. The sheet feed sensor 2001, 2002 or 2003 detects the timing of sheet feed by the sheet feed roller 213, 214 or 215. The guide 216 guides the fed sheet into the timing roller 217. At this time, the pass sensor 2004 detects the sheet passing. The timing roller 217 carries out the registration for matching the fed sheets with the toner image on the photosensitive drum 203 to thus adjust the paper feed timing. The toner image on the photosensitive drum 203 is transferred onto the sheet by electric field generated by the transfer charger 206. The carrying belt 209 carries the sheet to the fixing device 210 while moving in the direction of the arrow Q. The fixing device 210 fixes the toner on the sheet by heat.

The paper existing the fixing device 210 is guided by the guide 211, and the sheet ejection timing is detected by the sheet ejection sensor 2005 and led to a sorter 221 through a sheet ejection roller 212. The sorter 221 is provided with a plurality of sheet ejection trays (bins) and carries out the binding (sorting) in copying for each copy. Furthermore, the sorter 221 has a staple function or a punch function. A cleaner 207 removes any remaining toner on the photosensitive drum 203 from the photosensitive drum 203. The discharge lamp 208 eliminates the electric charges on the photosensitive member by exposing the photosensitive drum 203.

Next, the flow of a signals of the digital copying machine according to this embodiment will be explained with reference to a block diagram of FIG. 2.

Figure 2:
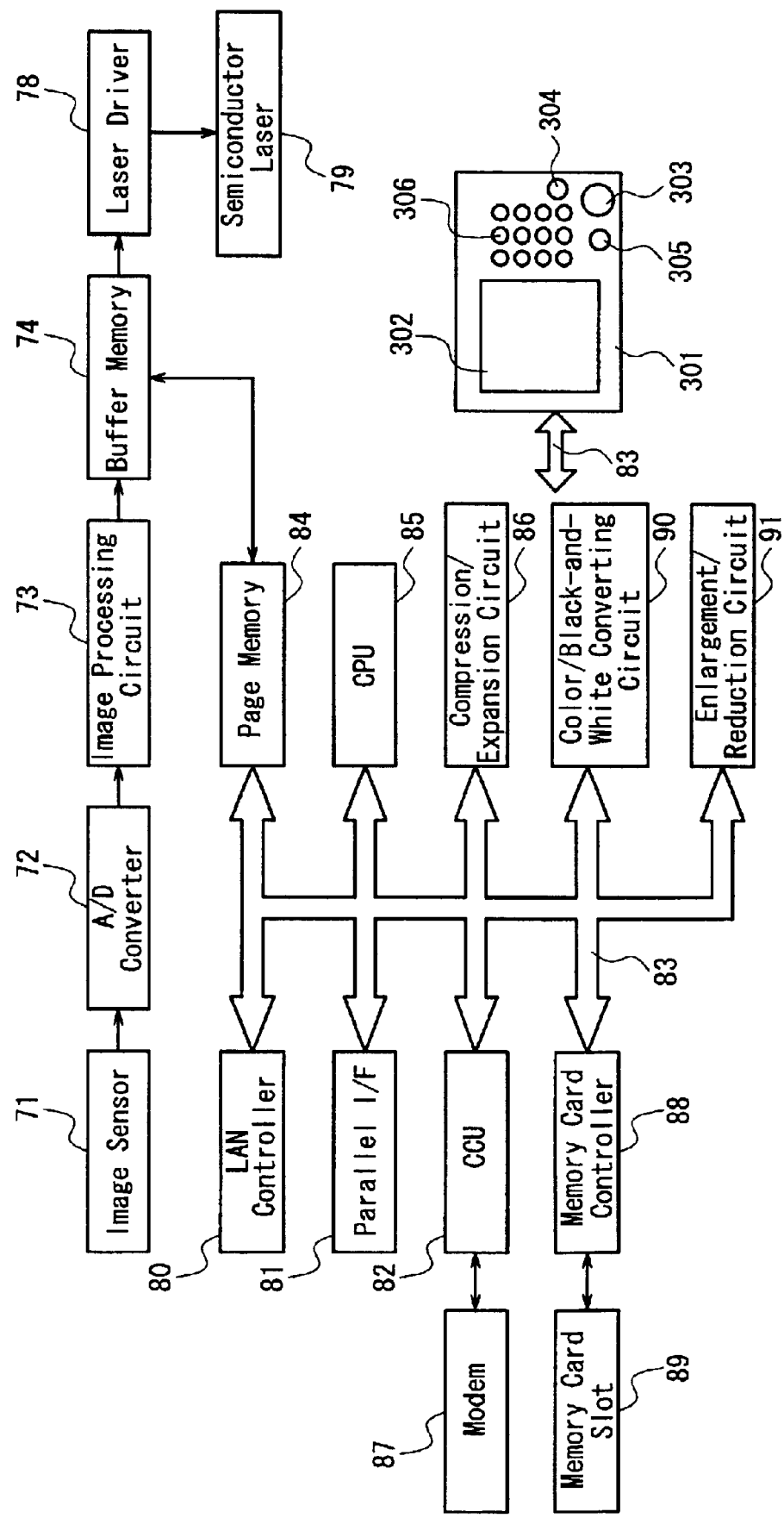
FIG. 2 is a block diagram showing a flow of signals in the digital copying machine shown in FIG. 1.

In FIG. 2, light reflected from a document, which is obtained by scanning the document, is converted into an electrical signal by an image sensor 71 and then converted into a digital image signal by an A/D converter 72. This digital image signal is subjected to image processing such as an edge enhancement, trimming, half-tone processing, or the like, and edit processing in an image processing circuit 73. The image signal output from the image processing circuit 73 is buffered in a buffer memory 74, for adjusting the speed for outputting signals to a laser driver 78. This laser driver 78 drives a semiconductor laser 79. An electrostatic latent image is formed by laser beams output from the semiconductor laser 79.

The buffer memory 74 is connected to a page memory 84. Furthermore, a page memory 84, a CPU 85, a LAN controller 80, a parallel I/F 81, a CCU (communication control unit) 82, a compression/expansion circuit 86 and a memory card controller 88 are connected mutually by a CPU bus 83.

The CPU 85 includes a RAM and a ROM, and controls an entire digital copying machine. The page memory 84 has capacity that can store at least one page of image data. Image data stored in the page memory 84 is output into the laser driver 78 through the buffer memory 74 to be recorded on a recording paper.

The LAN controller 80 communicates with an external equipment through a local area network (LAN). When the digital copying machine is used as a facsimile transmission server, an external equipment such as a computer etc. transmits a telephone number of a transmit destination or the image data to the digital copying machine through the LAN. The CPU 85 causes the compression/expansion circuit 86 to compress the image data received from the external equipment through the LAN as required.

The CCU 82 transmits the image data, which are MH compressed by the compression/expansion circuit 86, to an external facsimile through public lines using a modem 87.

Also, using a parallel I/F 81, the digital copying machine and an external equipment may be connected one to one. In this case, the digital copying machine may be controlled by a nearby computer. By executing dedicated software for controlling a digital copying machine on a computer connected to the digital copying machine, copy mode such as the number of pages and copies, a sheet size, copy density, a enlargement rate, duplex copying, a sorting method, and the like, can be set. Also, complicated edit setting such as the setting of frame erasure and a trimming area, or the setting of the negative/positive reversal and its area can be done using the display and the mouse of the computer.

The image data received by facsimile is expanded by the compression/expansion circuit 86, transferred to the page memory 84 and printed out. Furthermore, the document image data read out for facsimile transmission is stored in the page memory 84, then compressed by the compression/expansion circuit 86, and transmitted to the external facsimile through the CCU 82 and the modem 87.

A memory card controller 88 controls access from the CPU 85 to the memory card 124 inserted into the memory card slot 89. When a data file to be printed exists in the memory card 124 inserted into the memory card slot 89, this digital copying machine prints data in the data file to be printed.

Figure 12:
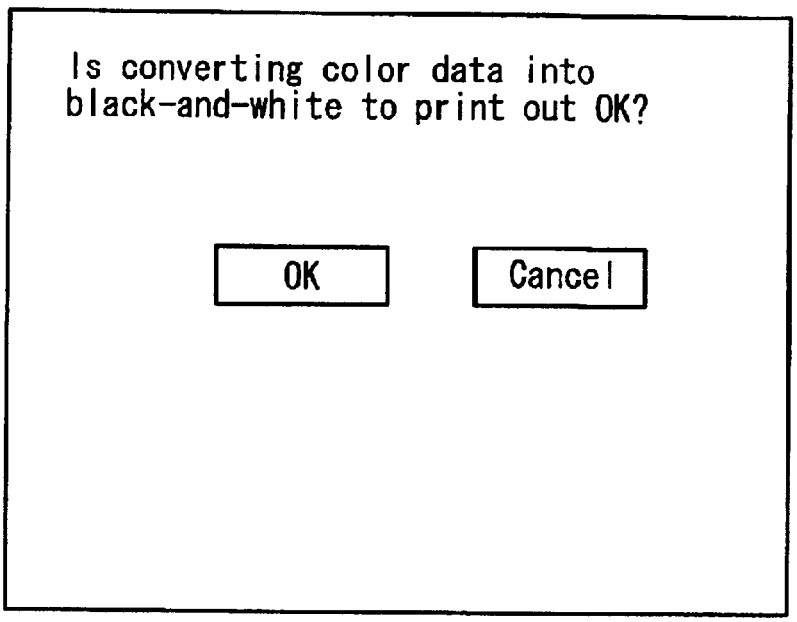
FIG. 12 shows one example of a screen for checking whether color data are converted into black/white data to print out.

In this embodiment, since the digital copying machine is a black-and-white type, when the CPU 85 determines that the data to be printed, which are stored in the memory card 124, are color image data, the color image data read out from the memory card 124 are stored in the page memory 84 and then converted into black-and-white image data by a color/black-and-white converting circuit 90. Next, a message, which allows a user to check whether original image data are color data but can be printed as a black-and-white image, is displayed on the liquid crystal display 302 with a touch panel in the control panel 301 on the operation portion 300 so as to allow the user to recognize that the original image data is color image data. After the user inputs an indication that printing a black-and-white image is "OK," black-and-white printing of the black-and-white image data is carried out. On the other hand, when the user indicates printing "Cancel," the printing is not carried out. FIG. 12 shows one example of the screen displayed at this time on the liquid crystal display 302 with touch panel.

Alternatively, when the CPU 85 determines that data to be printed, which are stored in the memory card 124, are color image data and the printing thereof requires the black-and-white conversion, and the number of reproductions of the color image data is limited based on the below mentioned management information (the presence or absence of reproduction limitations of object file), the execution of the printing is disabled.

The color/black-and-white determination by the CPU 85 of the image data stored in the memory card 124 is carried out based on the presence or absence of page(s) with color image data by searching the image data in the entire pages. As mentioned below, only if the image management information that relates to the image data to be printed is stored in the memory card 124 as a manager file, the color/black-and-white determination can be carried out easily by seeing the management information (a color space of the image data) indicating whether the image data to be printed includes color page(s) from the manager file.

Figure 13:
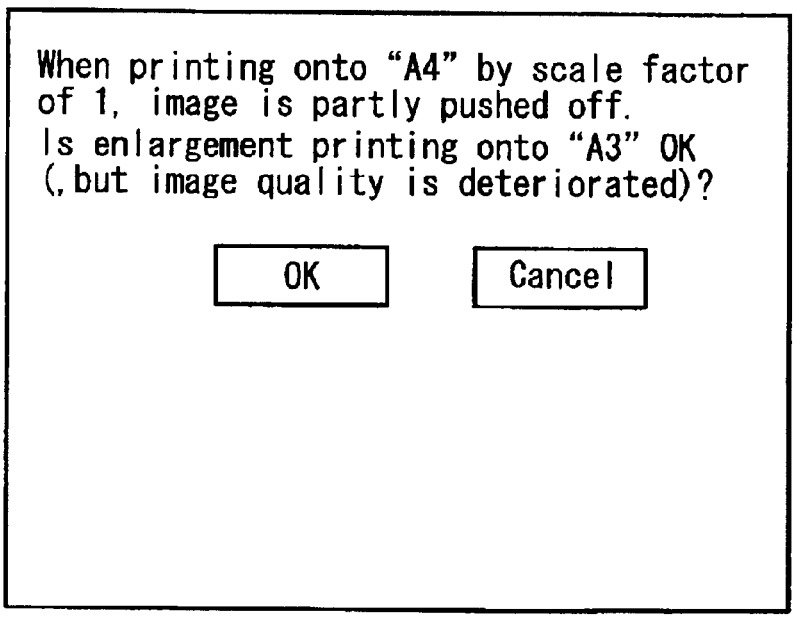
FIG. 13 shows one example of a screen for checking whether "A4" printing by scale factor of 1 can be changed into "A3" enlargement printing.

Furthermore, when the CPU 85 determines that the resolution (for example, 1200 dpi) of the data to be printed, which is stored in the memory card 124, is higher than the resolution (600 dpi) in printing by the digital copying machine, and that it is not possible to print by a scale factor of 1 onto A4 size recording sheets as requested by a user, so that the document needs to be printed onto A3 size recording sheets with enlargement, the CPU 85 displays a message for allowing a user to determine whether it is OK or not to carry out enlargement printing onto A3 size recording sheets by using the image enlargement function (zoom) of the enlargement/reduction circuit 91 shown in FIG. 2 and informing the user that when enlargement printing is carried out, the image will be deteriorated (see FIG. 13). Thereafter, when the user inputs an indication of the printing "OK," the enlargement printing is carried out, while when the user inputs an indication of the printing "Cancel," printing is not carried out.

Alternatively, when the CPU 85 decides that since the resolution of the data to be printed stored in the memory card 124 is lower than the printing resolution of the digital copying machine, image enlargement function is required and that, furthermore, based on the below-mentioned management information (the presence or absence of the reproduction limitations of the object file), the number of reproductions of the image data to be printed is limited, the execution of the printing is disabled.

Next, the configuration of a file to be stored in the memory card 124 will be explained with reference to FIGS. 3 to 7.

Figure 3:
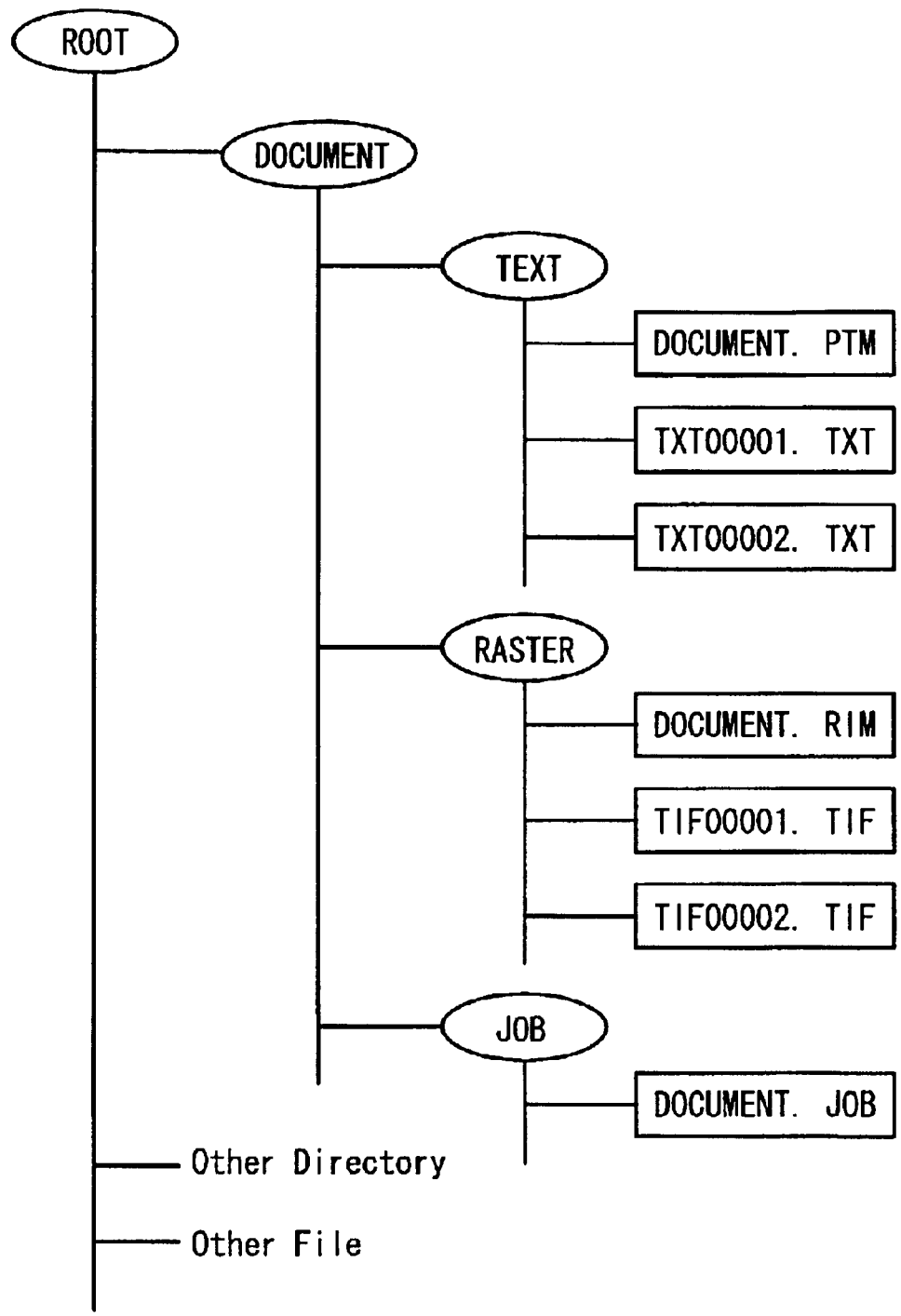
FIG. 3 is a view showing a configuration of directories and files by which data are recorded in a memory card 124 shown in FIG. 1.

FIG. 3 shows a configuration of directories and files for data to be recorded in the memory card 124.

In FIG. 3, below a root directory (ROOT), a directory DOCUMENT is placed. Below the directory DOCUMENT, all files according to the embodiment of the present invention are placed. Below the directory DOCUMENT, a directory for text data file (TEXT), a directory for multi-page image data file (RASTER) and a directory for job file (JOB) are placed.

The directory for text data file (TEXT) includes a plurality of text data files, TXT00001. TXT, TXT00002. TXT . . . and one text manager file DOCUMENT. PTM (Plain Text Manager) for managing the text data files. Moreover, numbers given to the data file name denote file numbers.

Figure 4:
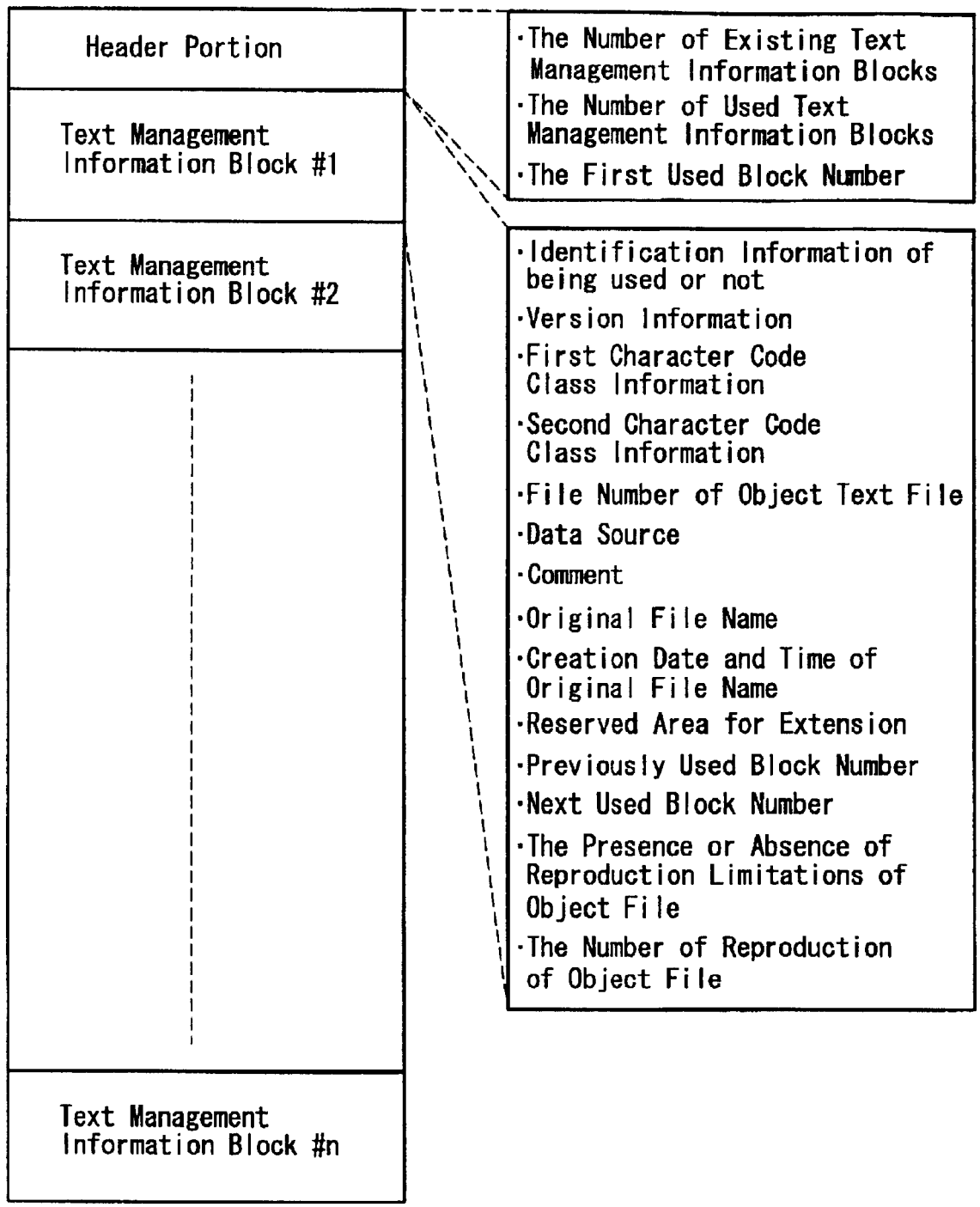
FIG. 4 is a view showing a file structure of a text manager file DOCUMENT. PTM in FIG. 3.

FIG. 4 is a view showing a file structure of the text manager file DOCUMENT. PTM.

In FIG. 4, the text manager the DOCUMENT. PTM includes a fixed-sized header portion that is essentially provided and a plurality of text management information blocks #1–#n each having a fixed size, which arbitrarily can be added and deleted (#1–#n denote block numbers).

The header portion includes the following information.
the number of text management information blocks existing in a text manager file
the number of used text management information blocks among the above-mentioned blocks
the first used block number indicating a text management information block that is used at first Furthermore, each text management information block includes the following information.
identification information of being used or not, which indicates whether the text management information block is used corresponding to whether the object text data file of the text management information exists
version information concerning the format of the text management information
first character code class information of character data used in the text data file
second character code class information of character data used in the text management information block
file number of the object text data file
data sources such as a transmitted mail, a received mail, an address list
comment concerning the text data file
original file name before the text data file is replaced with the above-mentioned TXT xxxxx. TXT (xxxxx denotes the file number)
creation date and time of the original file name
reserved area for extension
the previously used text management information block number (when the previous text management information block is not present, the number is 0)
the next used text management information block number (when the next text management information block is not present, the number is 0)
the presence or absence of reproduction limitations for the object text data file
the number of reproductions of the object text data file In the text manager file having such a configuration, by using the first used block number included in the header portion, the identification information of being used or not, the previously used text management information block number and the next used text management information block number included in each of the text management information blocks #1–#n, the text data file and its corresponding text management information can be stored efficiently. For example, the case where a text data file is added will be explained with reference to FIG. 5.

Figure 5A:
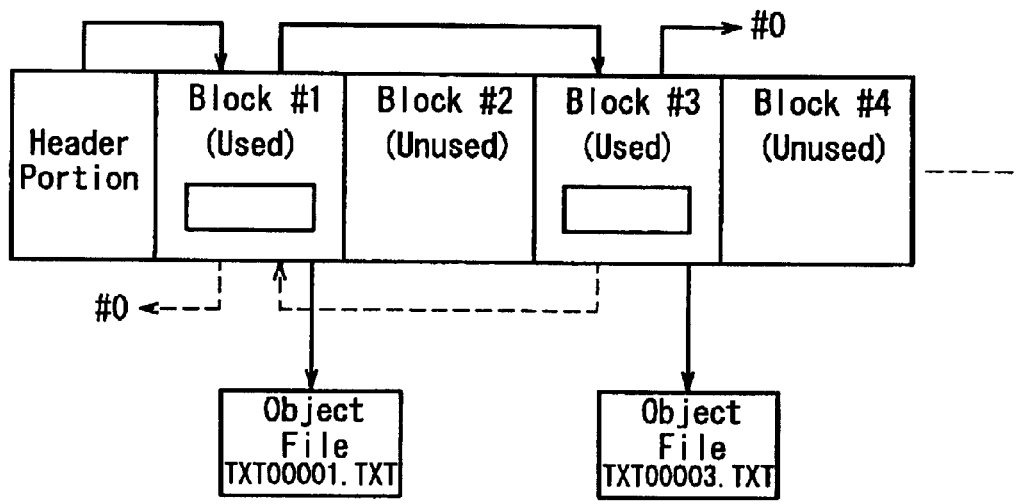
FIG. 5A is a schematic view showing a text manager file and object text files before text data files are added.
Figure 5B:
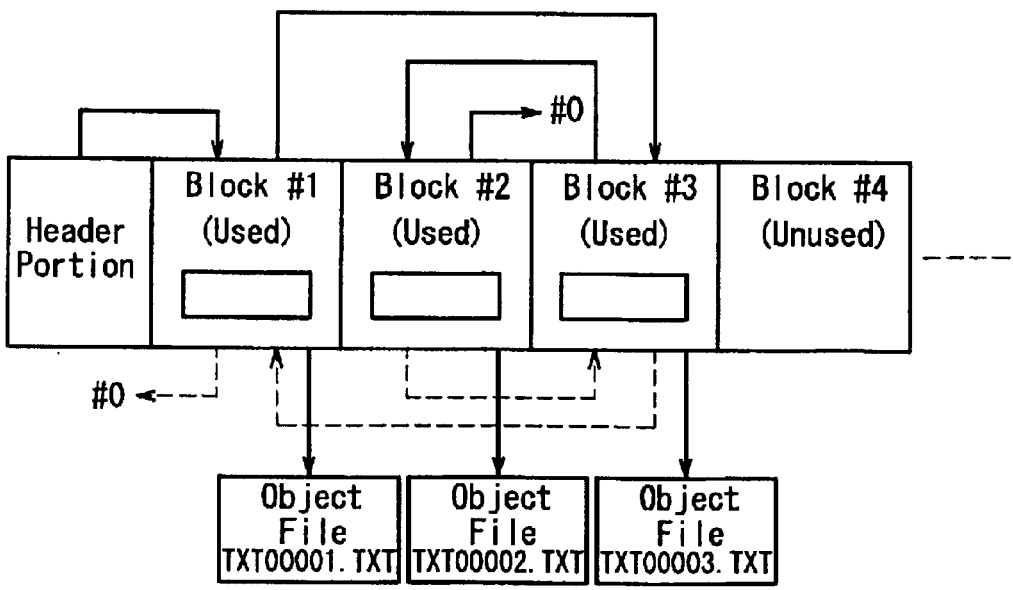
FIG. 5B is a schematic view showing a text manager file and object text files after text data files are added.

FIGS. 5A and 5B are schematic views showing the text manager file and the object file before and after the text data file is added, respectively. In FIGS. 5A and 5B, in one text management information block, the next used text management information block number is shown by the direction of the arrow with solid line and the previously used text management information block number is shown by the direction of the arrow with broken line.

As shown in FIG. 5A, first, since the first used block number indicates #1 in the header portion, by referring to #3 that is the next used block number in the text management information block #1, it is shown that the text management information block #2 placed between the text management information blocks #1 and #3 is unused.

Next, as shown in FIG. 5B, in the text management information block #2, the identification information of being used or not is changed from "unused" to "used" and the previously used block number is set to "#3" and the next used block number is set to #0. Thereafter, the next used block number in the text management information block #3 is changed from "#0" to "#2."

Next, the number of the used management information blocks in the header portion is increased by one, and then the text data file is stored with a file name TXT00002. TXT.

Thus, the previously used block number and the next used block number are included in each management information block, thereby a bidirectional list structure can be constructed and the text data file and its corresponding text management information can be stored into a memory card 124 efficiently.

Furthermore, the directory for multi-page image data file (RASTER) includes a plurality of image data files, TIF00001. TIF, TIF00002. TIF . . . and one image manager file DOCUMENT. RIM (Raster Image Manager) for managing the above-mentioned text data files. Moreover, for format of the multi-page image file, the generally used TIFF (Tag Image File Format) by Adobe Systems Incorporated is used.

Figure 6:
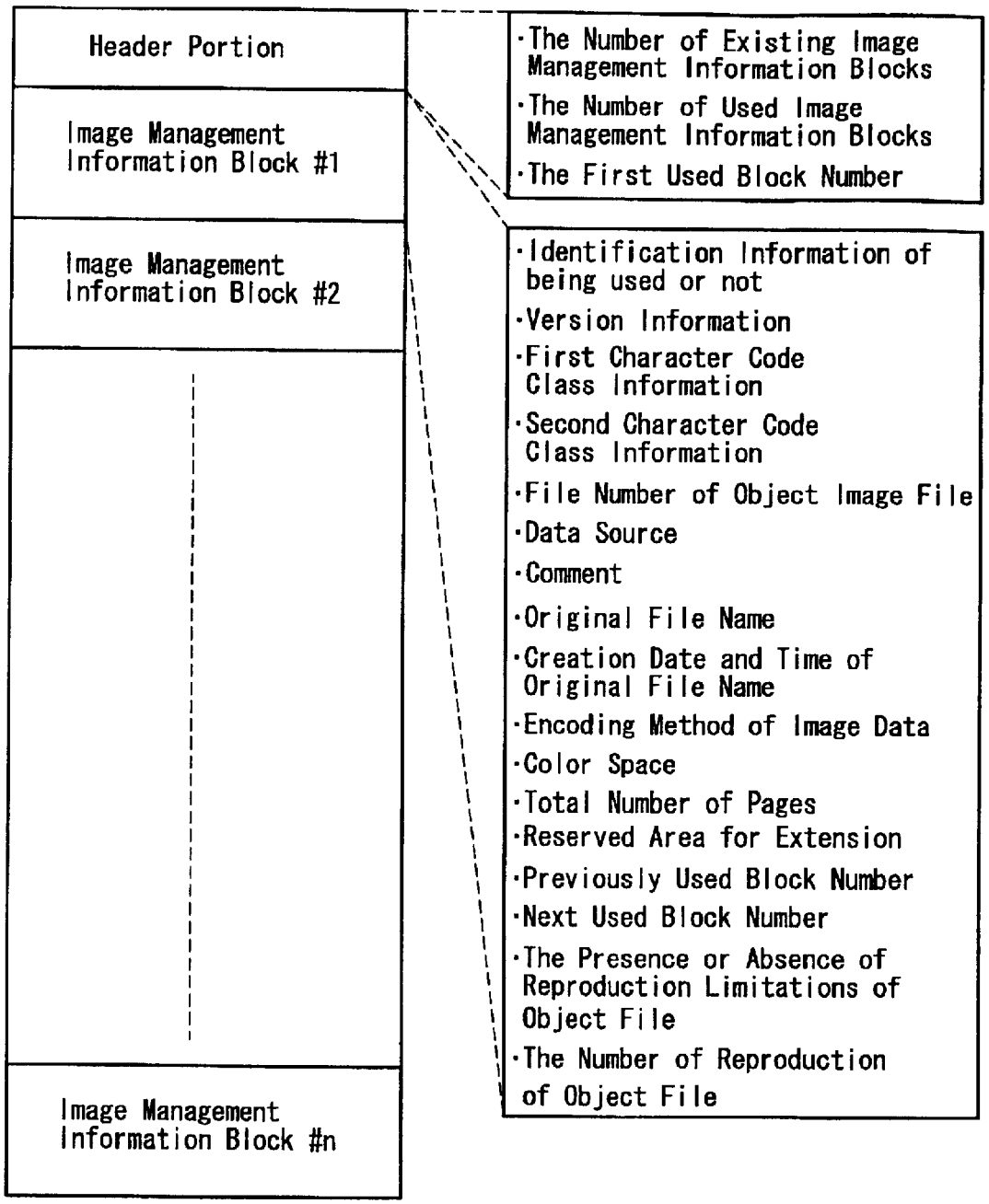
FIG. 6 is a view showing a file structure of a multi-page image manager file DOCUMENT. RIM in FIG. 3.

FIG. 6 shows a file structure of the image manager file DOCUMENT. RIM.

In FIG. 6, the image manager file DOCUMENT. RIM includes a fixed-sized header portion that is essentially provided and a plurality of image management information blocks #1–#n each having a fixed size, which arbitrarily can be added and deleted (#1–#n denote block numbers).

The header portion includes the following information.
the number of image management information blocks existing in the image manager file
the number of used image management information blocks among the above-mentioned blocks
the first used block number indicating an image management information block that is used at first Furthermore, each image management information block includes the following information.
identification information of being used or not, which indicates whether the image management information block is used corresponding to whether the object multi-page image data file of the image management information exists
version information concerning the format of the image management information
first character code class information of character data used in the multi-page image data file
second character code class information of character data used in the image management information block
file number of the object multi-page image data file
data sources such as a PC, an image scanner, a FAX, etc.
comment concerning the multi-page image data file
original file name before the multi-page image data file is replaced with the above-mentioned TIF xxxxx. TIF (xxxxx denotes the file number)
creation date and time of the original file name
encoding method of JPEG, JBIG, MH, etc. used in the multi-page image data (a plurality of encoding methods can be set because encoding method may be different from one page to another)
color space of YCbCr, La*b*, etc. used in the multi-page image data and color/black-and-white determination information (a plurality of color spaces can be set because color space may be different from one page to another)
total page number of multi-page image data
reserved area for extension
the previously used image management information block number (when the previous image management information block is not present, the number is 0)
the next used image management information block number (when the next image management information block is not present, the number is 0)
the presence or absence of the reproduction limitations of the object multi-page image data file
the number of reproductions of the object multi-page image data file Also, the image manager file has a bidirectional list structure and has similar advantages to the above-mentioned text manager file.

Furthermore, the directory for job file (JOB) shown in FIG. 3 includes one job file DOCUMENT. JOB for performing the processing such as display, printing, etc with respect to a plurality of text data files and a plurality of multiple image data files.

Figure 7:
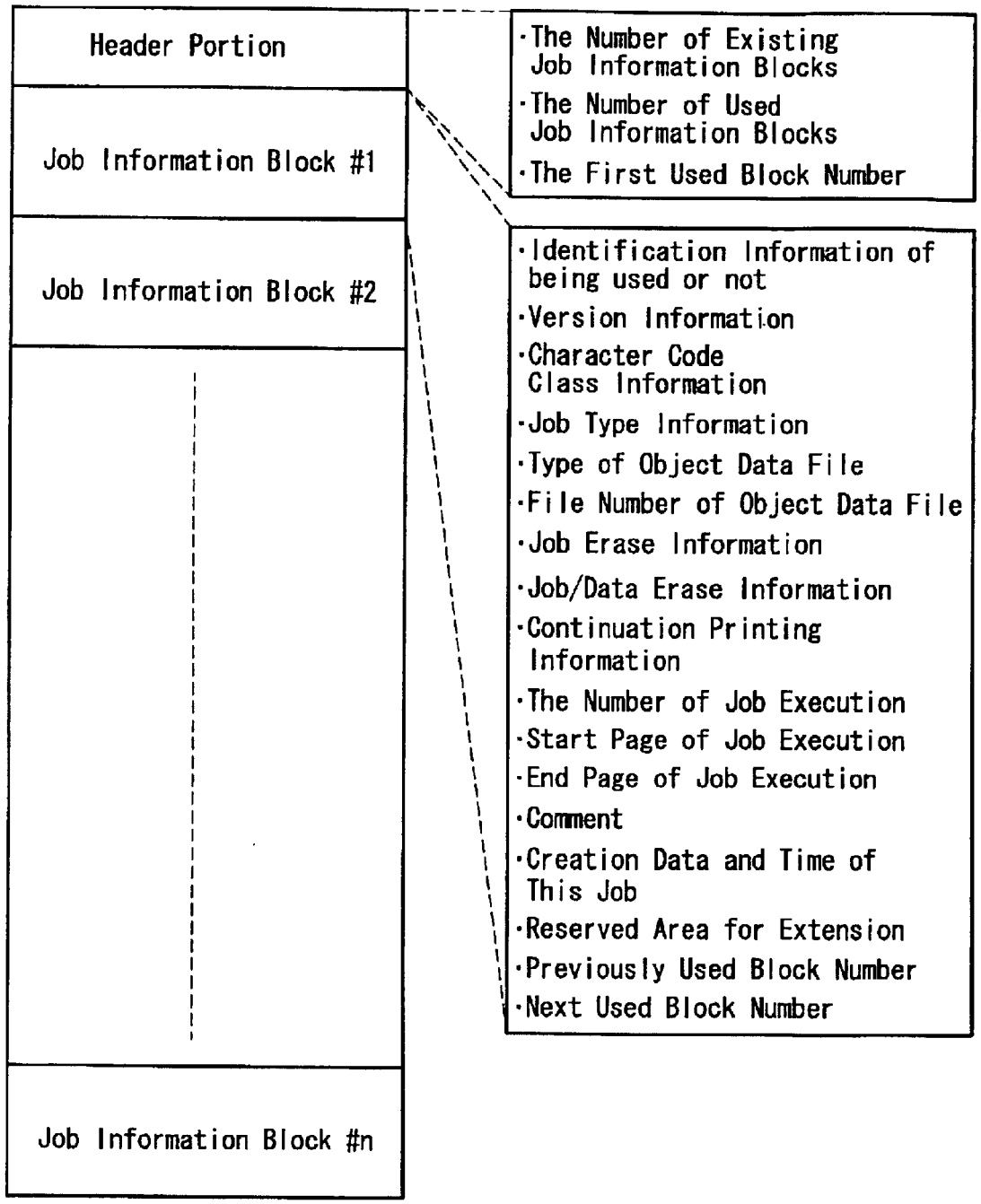
FIG. 7 is a view showing a file structure of a job file DOCUMENT. JOB in FIG. 3.

FIG. 7 shows a file structure of the job file, DOCUMENT. JOB.

In FIG. 7, the job file DOCUMENT. JOB includes a fixed-sized header portion that is essentially provided and a plurality of job information blocks #1–#n each having a fixed size, which arbitrarily can be added and deleted (#1–#n denote the block number).

The header portion of the job file includes the following information.
the number of job information blocks existing in the job file
the number of used job information blocks among the above-mentioned blocks
the first used block number indicating a job information block that is used at first Furthermore, each job information block includes the following information.
job information block identification information of being used or not, which indicates whether the job information block is used
version information concerning the format of the job information
character code class information of character data used in the job data file
job type information indicating the types of jobs to be carried out, such as display, print, etc.
type of the object data file indicating whether the object data file of job is the text data file or the multi-page image data file
file number of the object data file of job
job erase information indicating whether the job information is erased after the job is carried out normally
job/data erase information indicating whether both the job information and the object data file are erased after the job is carried out normally
continuation printing information indicating whether text data with a small data volume such as E-mail etc. is printed based on the current printing job continuously onto the same recording sheet on which text data with a small data volume such as E-mail etc. was printed based on the previous printing job the number of job execution such as printing of plural copies start page of job execution and end page of job execution, which are effective only for the multi-page image data file comment concerning the job creation date and time of the original file name reserved area for extension the previously used job information block number (when the previous job information block is not present, the number is 0)

the next used job information block number (when the next job information block is not present, the number is 0)

Also, the job file has a bidirectional list structure similar to the text and image manager files, thus enabling the addition and deletion of jobs to be carried out easily.

The following is an explanation of the case where one user writes data to be protected by copyright in the memory card 124 having the above-mentioned file structure, distributes the memory card 124 to another user, and then the user to whom the memory card 124 is distributed, carries out the data printing by the digital copying machine shown in FIG. 1. The data printing will be explained in accordance with the following steps.

First Step

Write of Data Protected by Copyright and Management Information Into Memory Card 124

The document data created by one user is converted into image data and the image data are written into a memory card 124 by, for example, a printer driver for memory card of a note-type personal computer provided with a memory card writer. When being written, similar to the case of the text data explained with reference to FIG. 5, in order to store the image management information corresponding to the image data into an image manager file DOCUMENT. RIM, first, a used blank image management information block (which is assumed to be block #2) is searched, and the image management information as shown in FIG. 6 is stored in the image management information block #2, while the image data are stored as an image data file TIF0002. TIF. In this case, in the image management information block #2, for example, "file number of object image file" is set to "00002." Since the document data are to be protected by copyright, "the presence or absence of reproduction limitations of the object file" is set to a flag "1" indicating that the reproduction limitations are present. "The number of reproduction of object file" is set to "10," if for example, permission of ten times, is the parameter reproduction given to a user. Moreover, in view of the protection of copyright, the image data file, and the information concerning the presence or absence of the reproduction, and the number of reproduction are encoded by a predetermined method.

Second Step

Write of Printing Job Information Into Memory Card 124

Figure 8:
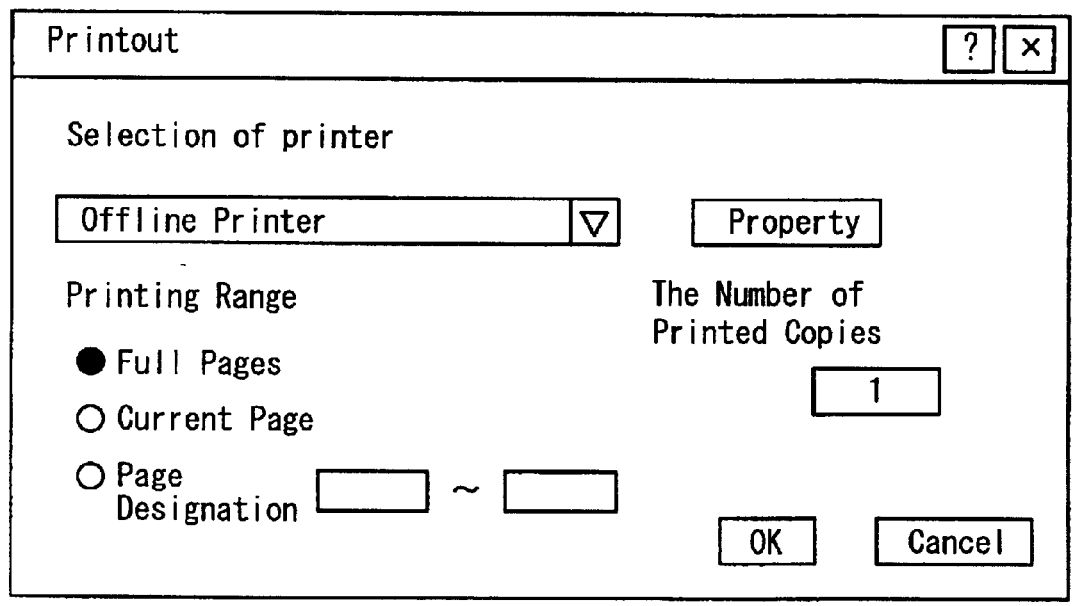
FIG. 8 shows one example of a screen for selecting an offline printer by a user.

Next, the case where another user offline prints the image data to be protected by copyright by a digital copying machine is assumed. First, as shown in FIG. 8, a user who created the image data allows a screen for selecting an offline printer driver to be displayed by a user interface of a note-type personal computer and selects the offline printer in the screen. Furthermore, the user selects as a printing range one of "full pages," "current page" and "page designation." In FIG. 8, "full pages" printing indicated by a mark ● is being selected. Furthermore, the number of printed copies is set to "1."

Next, the user selects the property of offline printer and allows a dialog box for setting a printing job of the digital copying machine to be displayed on the display of the note-type personal computer.

Figure 9:
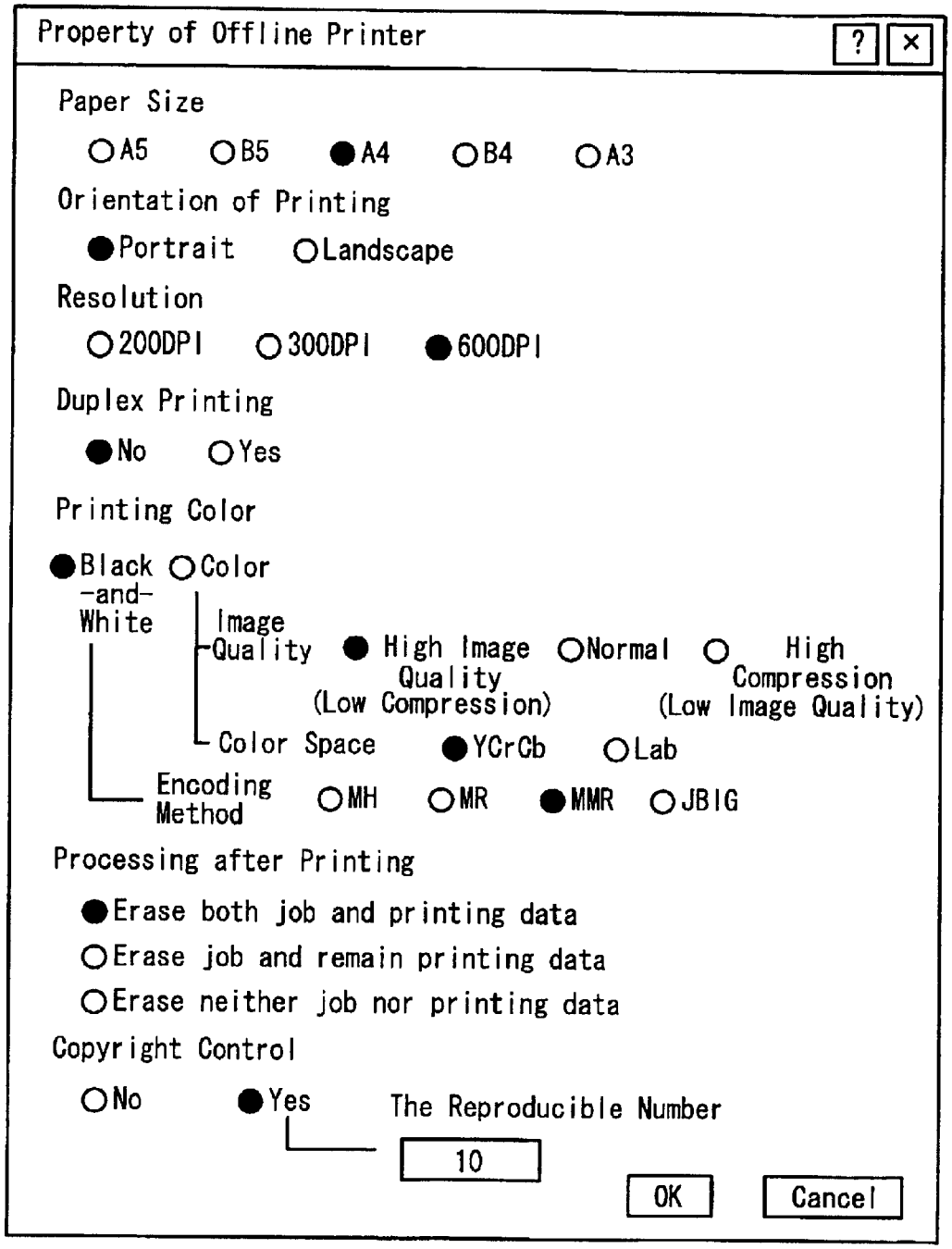
FIG. 9 shows one example of a dialog box for setting properties of an offline printer by a user.

FIG. 9 shows an example of the dialog box of the offline printer. Hereafter, the contents selected in the dialog box in FIG. 9 will be explained. In FIG. 9, a mark ● indicates the selected printing contents.

1. sheet size: The recording sheet is selected from "A5," "B5," "A4," "B5," and "A3."
2. orientation of printing: The orientation is selected from "portrait" and "landscape."
3. resolution: The resolution is selected from "200 DPI," "300 DPI," and "600 DPI." (DPI: Dot Per Inch)
4. duplex printing: "No" or "Yes" is selected.
5. printing color: The printing color of image data is selected from "black-and-white" and "color." When "black-and-white" is selected, the encoding method is selected from "MH," "MR," "MMR," and "JBIG," and when "color" is selected, the image quality is selected from "high image quality (low compression)," "normal," and "high compression (low image quality)". Furthermore, the color space is selected from "YCbCr" and "La*b*" (In the case of color printing, since the encoding method is only JBIG, selectable item concerning encoding method does not exist, and the quantization table used for the JPEG encoding is changed in accordance with the selection of the image quality).
6. processing after printing: The processing after printing is selected from "erase both job information and printing data," "erase job but remain printing data," and "erase neither job nor printing data."
7. copyright control: "Yes" or "No" is selected. When the copyright control is carried out, "the reproducible number" is designated.

The user clicks an OK button by the mouse after setting each item in the dialog box. The printer driver generates a job file according to the setting in the dialog box and stores the job file into the memory card 124. Herein, it is assumed that a new job file is generated and stored in the job information block #1 shown in FIG. 7. The content of the job file corresponding to the setting of the dialog box in FIG. 9 will be explained.

In the header portion of the job file, "the number of existing job information blocks" is set to the default value, since it is not necessary to add job information blocks, "the number of used information blocks" is set to "1," since only one job information block #1 is used and "the first used block number" is set to "1" corresponding to the job information block #1 of the created job information.

Furthermore, in the job information block #1, "identification information of being used or not" is set to a flag "1" indicating "used." The next "version information" is set to the memory card standard number that is supported by the write apparatus of this job. "Character code class information" is set to character code class number such as ASCII code, shift JIS etc. used in the job file.

The next "job type information" is set to a flag "0" indicating "printing." "Type of object data file" is set to a flag "1" indicating "image data" (in the case of the text data, the flag "0" is set). "File number of object data file" is set to "00002" corresponding to data file name TIF00002. TIF that is the object of job.

The next "job erase information" and "job/data erase information" is set to "0" and "1," respectively since the user selected to erase both job and printing data. Herein, in the dialog box in FIG. 9, when "erase job but remain printing data" is selected, "job erase information" and "job/data erase information" are set to flags "1" and "0," respectively. When "erase neither job nor printing data" is selected, "job erase information" and "job/data erase information" are set to flags "0" and "0," respectively.

Furthermore, "the number of job execution" is set to a parameter "1," since the user sets the number of printing is set to "1" on the screen shown in FIG. 8. "Start page of job execution" and "end page of job execution" are set to "1" that is a start page and to the number of the last page of the formed multi-page image data, respectively, since "full pages" is selected by the user. "Previously used block number" and "next used block number" are set to "0," since this job information is the first information to be stored.

Third Step

Offline Printing of Data to be Protected by Copyright

Figure 10:
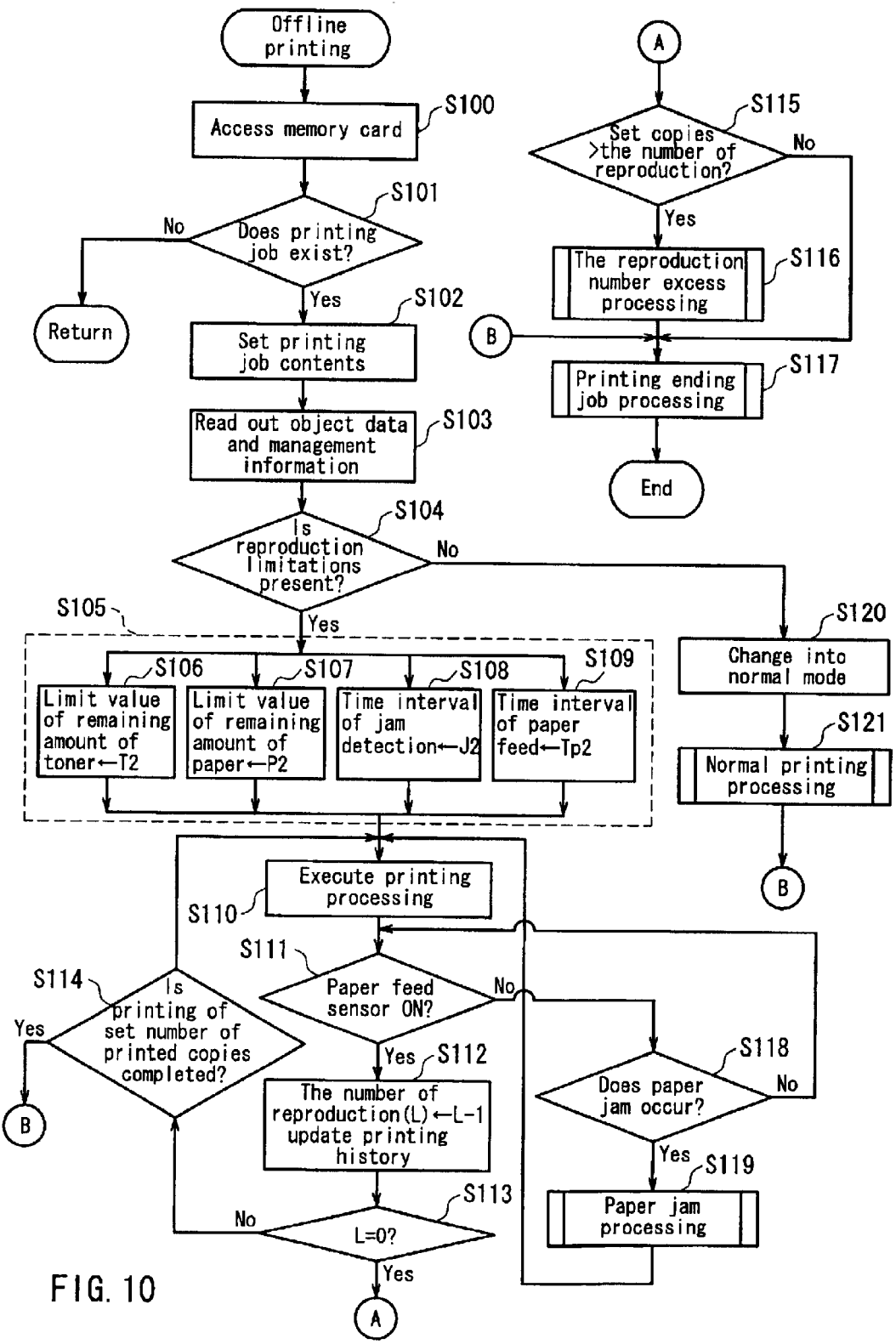
FIG. 10 is a flowchart showing processing steps in an image formation and control method according to one embodiment of the present invention.

FIG. 10 is a flowchart showing the processing steps of an image formation and control method according to one embodiment of the present invention. The offline printing will be explained with reference to the flowchart of FIG. 10.

A user pulls out the memory card 124 storing a multi-page image data file TIF00002. TIF, a manager file in which its corresponding image management information is described, and a job file in which the printing job information of the object image data is described, from the user's note-type personal computer and distributes the memory card 124 to another user. The user to whom the memory card 124 is distributed, inserts the memory card 124 into the memory card slot 89 of the digital copying machine.

The CPU 85 of the digital copying machine (FIG. 2) detects through a memory card controller 88 that the memory card 124 is inserted and accesses the memory card (step S100) and searches whether a job file in which printing job information is described exists in the memory card 124 (step S101). If the job file exists, the CPU 85 analyzes the printing job information in the job file and, in accordance with contents thereof, carries out the setting required for the control circuits of a laser printer portion 200 and a sorter portion 221. In this case, the setting is carried out so that "single-sided printing" is carried out onto "A4" recording sheets in the orientation of "portrait" with the resolution of "600 DPI" by "1" copy (step S102).

Furthermore, the CPU 85 reads out the multi-page image data file TIF00002. TIF from the memory card 124 with reference to the multi-page image data file name (TIF00002. TIF) indicated by the printing job information in the job file and stores it in the page memory 84 (step S103). At this time, by the determination in the step S104, the CPU 85 recognizes that the flag "1" is set in "the presence or absence of reproduction limitations of object file" of the image management information block #2 corresponding to the multi-page image data file TIF00002 and that "the number of reproductions of object file (L)" is set to "10."

As a result of the determination in the step S104, if the flag in "the presence or absence of reproduction limitations of object file" is "0," the mode is changed into the normal mode (performance priority mode) (step S120) and a normal printing processing step is carried out (step S121).

Since the flag "1" is set in "the presence or absence of reproduction limitations of object file" of the image management information block #2, the CPU determines that the image data of the multi-page image data file TIF00002. TIF are data to be protected by copyright and changes the printing mode from the normal mode (performance priority mode) for normal printing of document read-out data, etc. into the reliable mode (safety priority mode) capable of carrying out the printing onto a recording sheet more reliably than in the performance priority mode (step S105).

In this reliable mode, the following contents are set.

(1) The limit value of the remaining amount of toner by a toner remaining sensor 2006 is changed into the second set value (T2) that is larger than the first set value in the normal mode (step S106), and when the remaining amount of toner falls below the second set value, the execution of the data printing is disabled (printing processing execution processing in the step S110).

(2) The limit value of the remaining amount of recording sheets by a sheet remaining amount sensor 2007 corresponding to a "A4" size recording sheet cassette 218 is changed into the second set value (P2) that is larger than the first set value (zero) in the normal mode (step S107), and when the remaining amount of sheets falls below the second set value, the execution of the data printing is disabled (printing processing execution processing step in the step S110).

(3) Time interval of paper jam detection by the CPU 85 based on a sheet feed sensor 2001 corresponding to "A4" size, a pass sensor 2004, and a sheet ejection sensor 2005 is shortened as compared with the normal mode (J2) (step S108).

(4) Time interval of sheet feed is extended as compared with the normal mode (Tp2) (step S109).

With the above-mentioned settings, up to "10" times of reproduction, the printing density on the recording sheet is prevented from being lowered due to the shortage of toner, running out of paper does not occur, sheet jam is detected reliably, and it is possible to reduce the possibility of a problem in which although the feed error of the recording media is generated, a subsequent recording medium is fed, thus causing the false detection of the feed error.

Figure 11A:
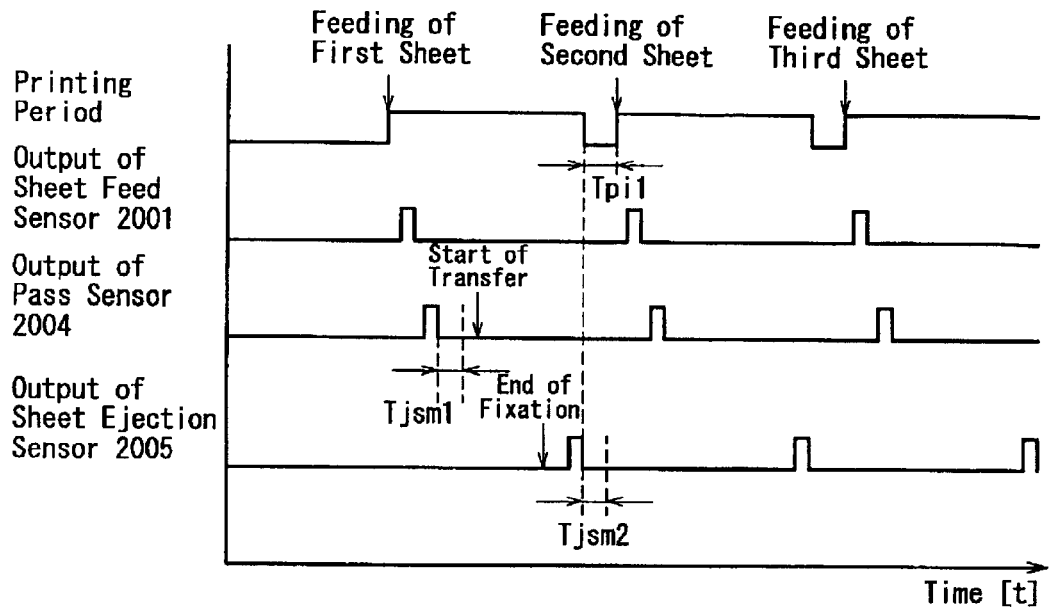
FIG. 11A is a timing chart showing a sequence for feeding paper in a normal mode.
Figure 11B:
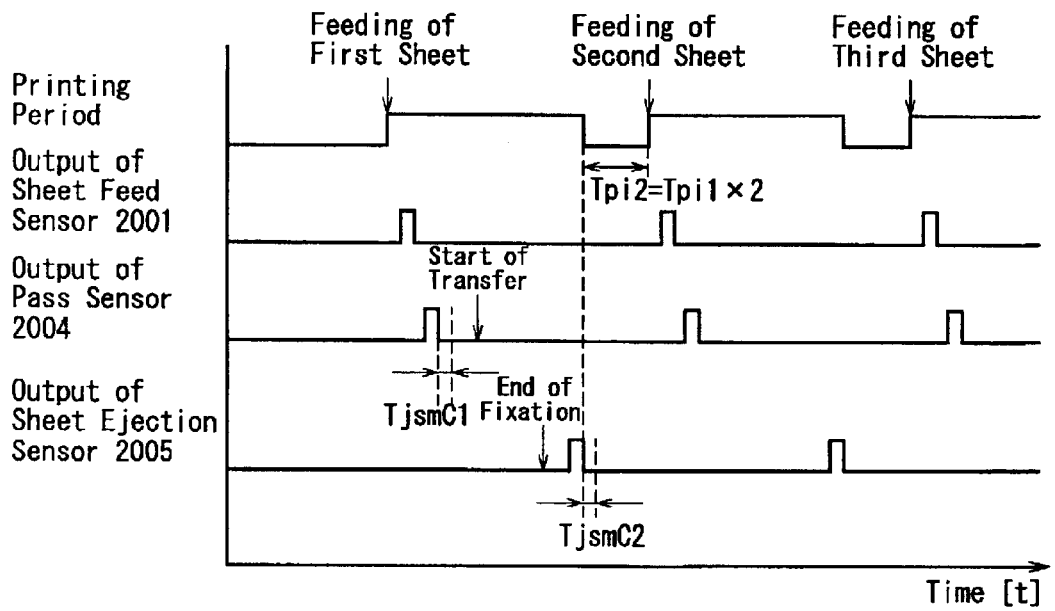
FIG. 11B is a timing chart showing a sequence for feeding paper in a reliable mode.

FIGS. 11A and 11B show the timing of a sequence for feeding sheets at a normal mode and a reliable mode, respectively. In FIGS. 11A and 11B, the time interval between the time the printing onto the first recording medium was finished and the time the second recording medium is fed, that is, the time interval of sheet feed Tpi is set so that the time interval of sheet feed Tpi 2 in the reliable mode is twice the time interval of sheet feed Tpi 1 in the normal mode.

Tjsm 1 in FIG. 11A denotes a margin of the time for detecting a sheet jam after the recording medium passes through the pass sensor 2004. Tjs 2 denotes a margin of the time for detecting a sheet jam after the recording medium is subjected to transfer and fixation and then is ejected. TjsmC 1 in FIG. 11B denotes a margin of the time for detecting sheet jam after the recording medium passes through the pass sensor 2004 in the reliable mode. TjsC 2 denotes a margin of the time for detecting sheet jam after the recording medium is subjected to transfer and fixation and then ejected.

The margin of the time for detecting sheet jam in the reliable mode (TjsmC 1, Tjsm C2) is set to be shorter than the margin of the time for detecting sheet jam in the normal mode (Tjsm 1, Tjsm 2), and thus the setting is such that feeding of several thicknesses, inclination, or the like of the recording media can be detected more reliably.

Furthermore, in the reliable mode, the CPU 85 determines whether the paper ejection ending signal is output from the sheet ejection sensor 2005 (sheet ejection sensor ON?: step S11). The CPU 85 reduces the parameter "number of reproductions of object file", which is a parameter stored in the memory card 124 as the image management information, one by one from "10" every time it receives the sheet ejection ending signal and updates the printing history (step S112).

In the step S111, when the sheet ejection ending signal is not output from the sheet ejection sensor 2005, it is determined whether the sheet jam occurs by comparing the ON time interval between the sheet feed sensor 2001 and the pass sensor 2004 with a predetermined time interval (step S118). As a result of the determination in the step S118, if it is determined that sheet jam does not occur, the flow returns to the step S111. If it is determined that sheet jam occurs in the step S118, the flow returns to the step S110 through sheet jam processing step in the step S119.

Next, in the step S113, it is determined whether the number of reproductions L becomes zero. When the number of reproduction is not yet zero and the printing of the predetermined copies has not been completed as a result of the determination in the step S114, the steps S110 to S113 are repeated. Thus, by managing the execution number of printing in accordance with the printing history, until "10" times, that is, the limit value of the number of reproduction, the execution of data printing onto the recording sheets can be secured.

Next, after the number of reproduction becomes zero, that is, the execution of the printing until "10" times, i.e., the limit value of the number of the reproduction is completed more than "10" times that is the limit value of the number of the reproduction of printing is requested in the determination in the step S115, the flow shifts to the reproduction number excess processing step of the step S116.

Figure 14:
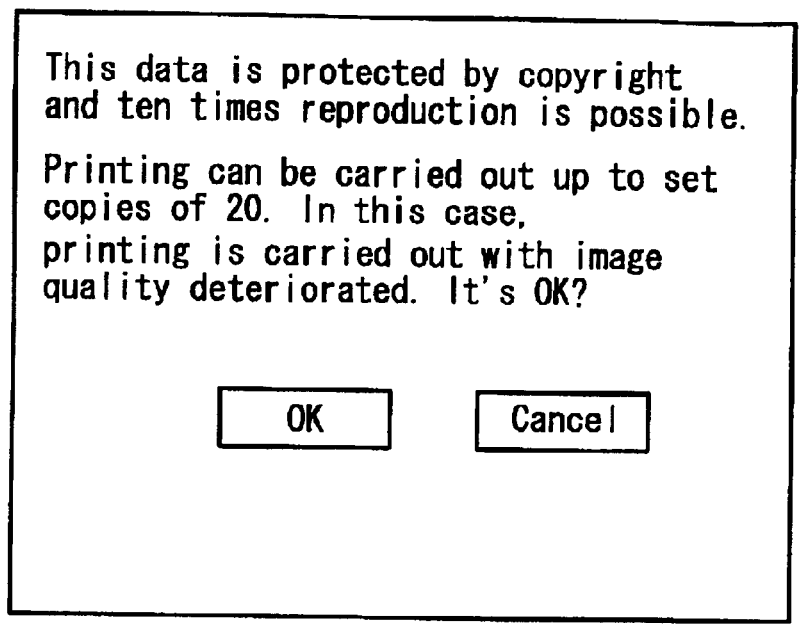
FIG. 14 shows one example of a screen for checking whether the printing is carried out until the set number of copies with image quality deteriorated when the number of reproducing data to be printed becomes zero.

In the reproduction number excess processing of the step S116, the execution of printing is disabled. Alternatively, as shown in FIG. 14, a message is displayed on the liquid crystal display 302 with a touch panel for informing a user that printing until the limit value (10) of the number of reproduction is completed, and allowing the user to check whether additional printing is carried out with the image deteriorated by processing the data to be printed stored in the memory card 124 or the data read out from the memory card 124, so that the data is protected by copyright in a easy way. Thereafter, if the user inputs an indication of "OK," the printing of the rest of copies is carried out. On the other hand, when the user inputs an indication of "Cancel," the printing job has finished.

Figure 15:
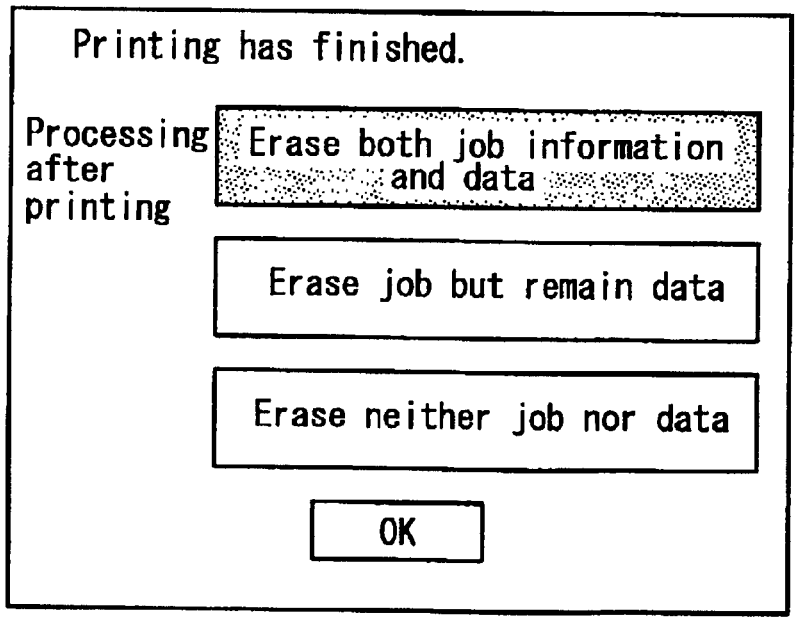
FIG. 15 shows one example of a screen for checking whether both printing data and printing job information are erased after printing job is finished.

When all the print outs specified in the job file are finished, the CPU 85 displays a message for allowing the user to check whether both printing job information and the image data file which is the object of job, stored in the memory card 124 object are erased based on the flags "0" and "1" respectively being set in "job erase information" and "job/data erase information" in the job information block #1. Only when the user inputs an indication of "OK" are both printing job information and the image data file which is the object of job erased (printing ending job processing step: step S117). FIG. 15 shows one example of the screen displayed at this time on the liquid crystal display 302 with a touch panel. As shown in FIG. 15, before the execution of the job is started, setting of parameters for printing job information may be changed.

Figure 16:
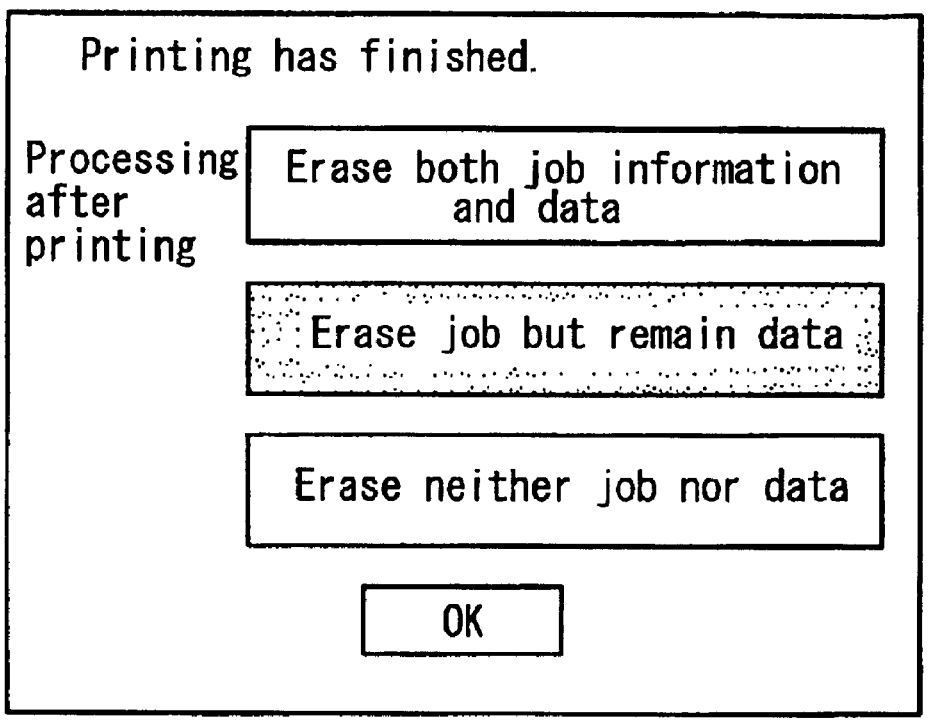
FIG. 16 shows one example of a screen for checking whether only job information is erased after printing job is finished.
Figure 17:
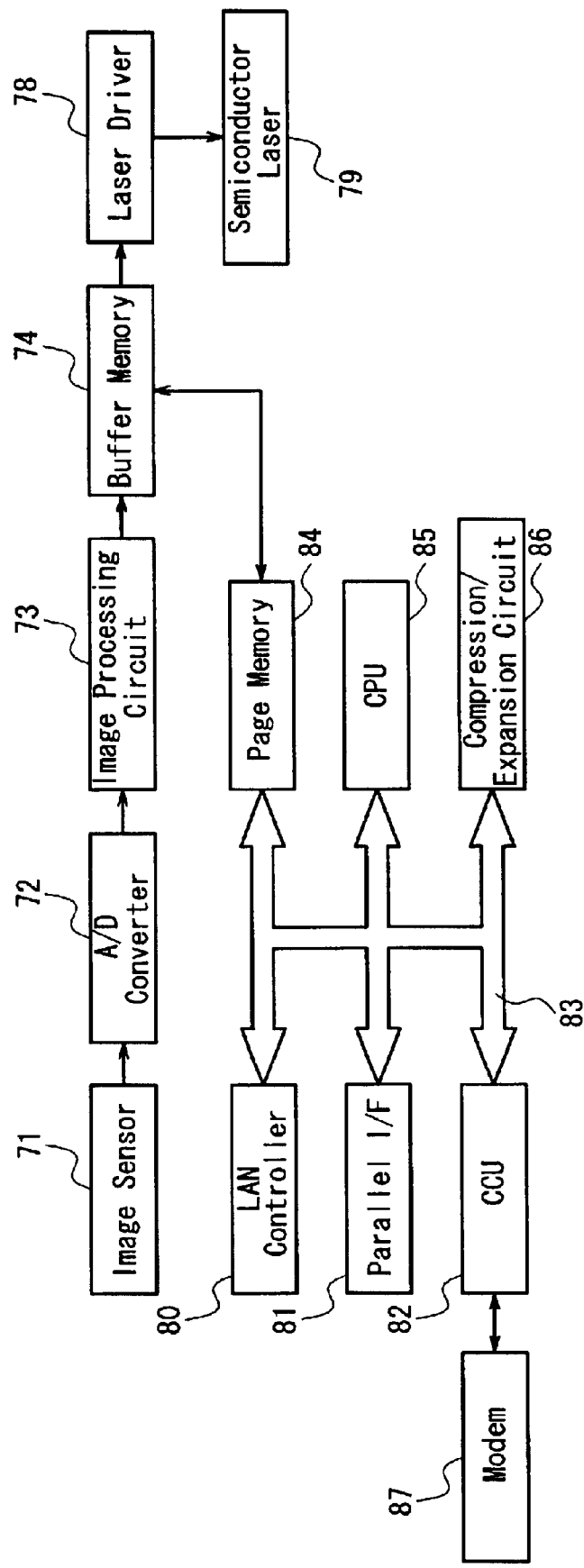
FIG. 17 is a block diagram showing a flow of signals in a conventional digital copying machine.
Figure 18:
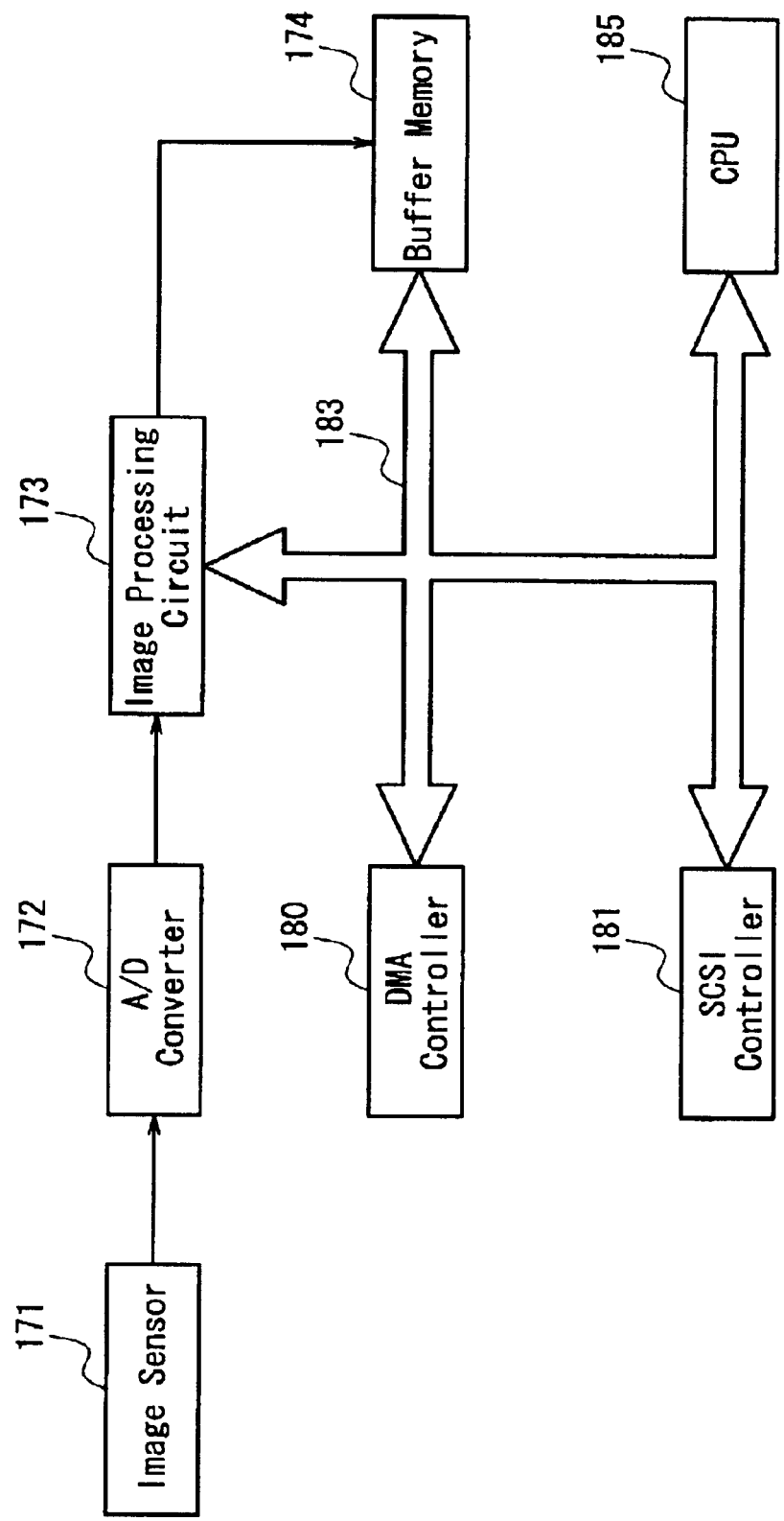
FIG. 18 is a block diagram showing a flow of signals in a conventional image reader.

In the above-mentioned example, the flags of "job erase information" and "job/data erase information" are set to "0" and "1," respectively. When the flags of "job erase information" and "job/data erase information" are set to "0" and "1," respectively, the CPU 85 displays a message for allowing the user to check whether only the printing job information is erased and only when the user inputs an indication of "OK," the printing job information is erased. FIG. 16 shows one example of the screen displayed at this time on the liquid crystal display 302 with a touch panel. As shown in FIG. 16, before the execution of the job is started, setting of parameters for printing job information may be changed.

In the above-mentioned embodiment, the case where the data protected by copyright, which is created by one user, is stored in the memory card 124 inserted into the note-type personal computer together with the management information and job information, the memory card 124 is pulled out and distributed to another user, and then the user to whom the memory card 124 is distributed, inserts the memory card 124 into the digital copying machine, thereby using the digital copying machine as an offline printer. However, the present invention is not necessarily limited to the offline printer and can be applied to a network printer etc. to which a user's personal computer to which data to be protected by copyright is downloaded via the internet, is connected.

In the embodiment of the present invention, as the portable storage medium, the memory card 124 is used. Using floppy disk, optical disk, removable hard disk, etc. can provide the same effect.

Furthermore, in the above mention, the case of using a monochrome digital copying machine is explained, the same is true in the case of using a color copying machine.

As mentioned above, according to the present invention, in printing contents of file by using a printer etc. provided with a memory card reader, when the number of reproduction is limited from the viewpoint of the protection of copyright, even if the problems in printing such as sheet jam, shortage of toner, ink, sheets, etc. occur within the permitted number of reproduction, it is possible to provide the user with printing of the permitted number of reproductions reliably.

Furthermore, when the user carries out the printing more than the permitted number of reproductions, or does the like, it is possible to protect copyright of the printing data easily by limiting the printing with processing: deteriorating original data of the data to be printed; deteriorating data at that time of printing the image of the read out data without deteriorating the original data; or the like.

Moreover, in the case of the network printer, the printing of the printing data received through the network is controlled, and even if the troubles at the time of printing occur when the number of reproductions is limited, it is possible to provide a user with the printing within the permitted number or reproduction reliably. Furthermore, when the user carries out printing beyond the permitted number of reproductions, or does the like, it is possible to easily protect copyright of the printing data.

What is claimed is:

1. An image formation and control method, comprising
   a performance priority mode for normally reproducing data to be printed and
   a safety priority mode capable of carrying out the required reproduction up to a permitted number of reproductions more reliably than in the performance priority mode,
   wherein the performance priority mode or the safety priority mode is selectable.

2. The image formation and control method according to claim 1, wherein when the mode is changed into the safety priority mode capable of carrying out the reproduction more reliably than in the performance priority mode, a second condition is set in which a feed control accuracy of the recording media is higher than in a first condition in which the performance priority mode is set.

3. The image formation and control method according to claim 2, wherein printing management information indicating whether the number of reproductions is limited is added to the data to be printed and when it is determined that the number of reproductions is limited with reference to the information, the condition is changed into the second condition for setting the safety priority mode in which the feed control accuracy of the recording medium is higher than in the first condition in which the performance priority mode is set.

4. The image formation and control method according to claim 2, wherein the first and the second conditions respectively comprise first and second time intervals for detecting the feed state of the recording media, and the second time interval is shorter than the first time interval.

5. The image formation and control method according to claim 2, wherein the first and the second conditions respectively comprise first and second feed intervals between the recording media, and the second feed interval is longer than the first feed interval.

6. The image formation and control method according to claim 2, wherein the first and the second conditions respectively comprise a first time margin and a second time margin in detecting feed errors of the recording media, and the second time margin is shorter than the first time margin.

7. The image formation and control method according to claim 1, wherein when the mode is changed into the safety priority mode capable of carrying out the reproduction more reliably than in the performance priority mode, the limit value of the remaining amount of a marking agent used for data printing onto recording media is changed from a first set value to a second set value that is larger than the first set value and when it is determined that the detected remaining amount is not more than the second set value, as a result of detecting the remaining amount of the marking agent, the execution of the data printing is controlled to be disabled.

8. The image formation and control method according to claim 1, wherein when the mode is changed into the safety priority mode capable of carrying out the reproduction more reliably than in the performance priority mode, the limit value of a remaining amount of recording media on which data are printed is changed from a first set value to a second set value that is larger than the first set value and when it is determined that the detected remaining amount is not more than the second set value, as a result of detecting the remaining amount of the recording media, the execution of the data printing is controlled to be disabled.

9. The image formation and control method according to claim 1, wherein when the mode is changed into the safety priority mode capable of carrying out the reproduction more reliably than in the performance priority mode and the data-processing is required for printing, the method allows a user to check whether the data printing is carried out.

10. The image formation and control method according to claim 1, wherein when the mode is changed into the safety priority mode capable of carrying out the reproduction more reliably than in the performance priority mode and the data-processing is required for printing, the execution of the data printing is controlled to be disabled.

11. An image formation and control method, comprising
a performance priority mode for normally reproducing data to be printed and
a safety priority mode capable of carrying out the required reproduction more reliably than in the performance priority mode,
wherein when the number of reproductions of the data to be printed is limited, the performance priority mode is changed into the safety priority mode.

12. An image formation and control method, comprising
a performance priority mode for normally reproducing data to be printed and
a safety priority mode capable of carrying out the required reproduction more reliably than in the performance priority mode,
wherein either the performance priority mode or the safety priority mode is selected based on printing management information added corresponding to the data to be printed.

13. The image formation and control method according to claim 12, wherein the printing management information comprises information indicating whether the number of reproductions of the data to be printed is limited and when it is determined that the number of reproductions is limited with reference to the information, the limit value of a remaining amount of a marking agent used for data printing onto recording media is changed from a first set value to a second set value that is larger than the first set value, and when it is determined that the detected remaining amount is not more than the second set value, as a resulting of detecting the remaining amount of the marking agent, the execution of the data printing is controlled to be disabled.

14. The image formation and control method according to claim 12, wherein the printing management information comprises information indicating whether the number of reproductions of the data to be printed is limited and when it is determined that the number of reproductions is limited with reference to the information, the limit value of a remaining amount of recording media on which data are printed is changed from a first set value to a second set value that is larger than the first set value and when it is determined that the detected remaining amount is not more than the second set value, as a result of detecting the remaining amount of the recording media, the execution of the data printing is controlled to be disabled.

15. The image formation and control method according to claim 12, wherein the printing management information comprises information indicating whether the number of reproductions of the data to be printed is limited and when it is determined that the number of reproductions is limited with reference to the information and the data-processing is required for printing, the method allows a user to check whether the data printing is carried out.

16. The image formation and control method according to claim 12, wherein the printing management information comprises information indicating whether the number of reproductions of the data to be printed is limited and when it is determined that the number of reproductions is limited with reference to the information and the data-processing is required for printing, the execution of the data printing is controlled to be disabled.

17. An image formation and control method, comprising
a performance priority mode for normally reproducing data to be printed and
a safety priority mode capable of carrying out the required reproduction more reliably than in the performance priority mode,
wherein when the number of reproductions of the data to be printed in limited, the performance priority mode is changed into the safety priority mode based on the printing management information added corresponding to the data to be printed.

18. An image formation and control method, comprising
a performance priority mode for normally reproducing data to be printed, and a safety priority mode capable of carrying out the required reproduction more reliably than in the performance priority mode, the method comprising:

changing the performance priority mode into the safety priority mode when the number of reproductions of the data to be printed is limited;

managing the number of printing of the data to be printed as a printing history; and controlling the printing of the data to be printed based on the number of reproductions of the data to be printed and the managed printing history.

19. The image formation and control method according to claim 18, wherein the method comprises: detecting the ejection of recording media on which the data printing is carried out; receiving a printing end information for reducing the number of reproductions of the data to be printed one by one in response to the detection of the ejection of the recording media; and updating the printing history based on the printing end information.

20. The image formation and control method according to claim 18, wherein when the remaining number of reproductions in the printing history becomes zero, the condition is changed into the third condition for setting the third mode in which the data printing is carried out with the image quality deteriorated.

21. The image formation and control method according to claim 20, wherein the third condition comprises a setting for processing to deteriorate the image of the data to be printed.

22. The image formation and control method according to claim 20, wherein the third condition comprises a setting for processing to deteriorate the image of the read-out data without deteriorating the data so as to be printed.

23. The image formation and control method according to claim 18, wherein when the remaining number of reproduction in the printing history becomes zero, the execution of the data printing is disabled.

24. An image formation and control method, comprising controlling the execution of the data printing to be disabled when it is determined that the detected remaining amount of the recording media is not more than a predetermined limit value, as a result of detecting the remaining amount of recording media for data printing, wherein when the number of reproductions of the data to be printed is limited, the execution of the data printing is controlled to be disabled based on the detected remaining amount of the recording media on which the data printing is carried out.

25. An image formation and control method, comprising allowing a user to determine whether the data printing is carried out when the number of reproductions of the data to be printed has limitations and the data-processing is required for printing.

26. The image formation and control method according to claim 25, wherein the criterion by which to determine whether the data-processing is required for printing is whether the data printing requires the resolution conversion.

27. The image formation and control method according to claim 25, wherein the criterion by which to determine whether the data-processing is required for printing is whether the data printing requires the color/black-and-white conversion.

28. An image formation and control method, comprising controlling the execution of the data printing to be disabled when the number of reproductions of the data to be printed is limited and the data-processing is required for printing.

29. An image formation and control method, comprising carrying out the data printing with the image quality deteriorated when the number of reproductions of data to be printed is limited and the remaining number of reproductions becomes zero by repeating the reproduction of the data.

30. An image formation and control method, comprising disabling the execution of the data printing when the number of reproductions of the data to be printed is limited and the remaining number of reproductions becomes zero by repeating the reproduction of the data.

31. An image formation apparatus using the image formation and control method according to claim 1.

32. A storage medium, to which the first image formation and control method according to claim 1 is applied and in which the data to be printed are stored.

33. The storage medium according to claim 32, wherein the storage medium is a portable storage medium.

34. A storage medium, to which the first image formation and control method according to claim 12 is applied and in which the data to be printed are stored.

35. The storage medium according to claim 34, wherein the storage medium is a portable storage medium.

* * * * *

UNITED STATES PATENT AND TRADEMARK OFFICE
CERTIFICATE OF CORRECTION

PATENT NO. : 6,771,914 B2
DATED : August 3, 2004
INVENTOR(S) : Takamine et al.

It is certified that error appears in the above-identified patent and that said Letters Patent is hereby corrected as shown below:

Column 26,
Line 61, "be printed in limited," should read -- be printed is limited, --

Signed and Sealed this

Twelfth Day of April, 2005

JON W. DUDAS
*Director of the United States Patent and Trademark Office*